(12) United States Patent
Mallikarjunan et al.

(10) Patent No.: US 11,706,679 B2
(45) Date of Patent: *Jul. 18, 2023

(54) HIGH DATA MODE FOR ENHANCED USER EXPERIENCE IN CELLULAR NETWORKS

(71) Applicant: Apple Inc., Cupertino, CA (US)

(72) Inventors: Raghuveer Mallikarjunan, Sunnyvale, CA (US); Patrick L Coffman, San Francisco, CA (US); Madhusudan Chaudhary, Campbell, CA (US); Muthukumaran Dhanapal, Dublin, CA (US); Ajay Singh, San Jose, CA (US); Faraz Faheem, Santa Clara, CA (US); Thanigaivelu Elangovan, Cupertino, CA (US); Lakshmi N Kavuri, Cupertino, CA (US); Samuel J Miller, San Jose, CA (US); Najeeb M Abdulrahiman, Fremont, CA (US); Rajesh Ambati, Los Altos Hills, CA (US); Arun G Mathias, Los Altos, CA (US); Vivek Ramanna, San Jose, CA (US); Divyaprakash P Bhojkumar, Santa Clara, CA (US); Vikram B Yerrabommanahalli, Saratoga, CA (US); Rafael L Rivera-Barreto, Santa Clara, CA (US); Sergey Sitnikov, San Jose, CA (US); Oleg M Moskalenko, Ben Lomond, CA (US); Bao Q Ho, San Jose, CA (US); Rohan C Malthankar, San Jose, CA (US); Samy Touati, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,235

(22) Filed: Jan. 17, 2022

(65) Prior Publication Data
US 2022/0141744 A1 May 5, 2022

Related U.S. Application Data

(63) Continuation of application No. 16/902,966, filed on Jun. 16, 2020, now Pat. No. 11,234,178.

(51) Int. Cl.
*H04W 4/00* (2018.01)
*H04W 36/14* (2009.01)
(Continued)

(52) U.S. Cl.
CPC ........... *H04W 36/14* (2013.01); *H04W 24/08* (2013.01); *H04W 36/30* (2013.01); *H04W 60/005* (2013.01); *H04W 76/15* (2018.02)

(58) Field of Classification Search
CPC ..... H04W 36/14; H04W 24/08; H04W 36/30; H04W 60/005; H04W 76/15; H04W 88/06; H04W 48/18; H04W 12/084
(Continued)

(56) References Cited

U.S. PATENT DOCUMENTS

| 7,848,756 B2 * | 12/2010 | Nader | H04J 11/0093 |
| | | | 455/437 |
| 7,949,375 B2 * | 5/2011 | Kortge | H04L 67/12 |
| | | | 455/418 |

(Continued)

*Primary Examiner* — Amancio Gonzalez
(74) *Attorney, Agent, or Firm* — Kowert, Hood, Munyon, Rankin & Goetzel, P.C.

(57) ABSTRACT

Apparatuses, systems, and methods for high data mode operation in cellular networks. A UE may determine, for an interface to a high-speed cellular network, a categorization from a plurality of categorizations, determine availability of the high-speed cellular network, and select, based at least in part on the categorization and availability of the high-speed cellular network, the interface for a data connection to the
(Continued)

high-speed cellular network. The categorization may be one of expensive or not expensive and/or one of a first level associated with a higher compression codec rate or a second level associated with a lower compression codec rate. The UE may receive, from one of the a low-speed cellular network or the high-speed cellular network, carrier plan information for a cellular data service carrier and analyze the carrier plan information to determine desirability of a switch, e.g., from the low-speed cellular network to the high-speed cellular network.

20 Claims, 23 Drawing Sheets

(51) Int. Cl.
*H04W 24/08* (2009.01)
*H04W 36/30* (2009.01)
*H04W 60/00* (2009.01)
*H04W 76/15* (2018.01)

(58) Field of Classification Search
USPC .......................................................... 370/329
See application file for complete search history.

(56) References Cited

U.S. PATENT DOCUMENTS

| | | | |
|---|---|---|---|
| 8,438,151 B1* | 5/2013 | Billman | G06Q 30/02 |
| | | | 707/713 |
| 8,855,709 B2* | 10/2014 | Mueck | H04W 48/18 |
| | | | 455/574 |
| 9,253,680 B2* | 2/2016 | Poltorak | H04W 4/24 |
| 9,668,203 B2* | 5/2017 | Zhang | H04W 8/20 |
| 9,706,563 B2* | 7/2017 | Papp | H04L 67/61 |
| 9,736,865 B2* | 8/2017 | Oh | H04W 74/0875 |
| 9,955,332 B2* | 4/2018 | Raleigh | H04W 4/50 |
| 10,104,641 B2 | 10/2018 | Himayat et al. | |
| 10,395,342 B2* | 8/2019 | Nam | G09G 3/003 |
| 10,470,060 B1* | 11/2019 | Paranjpe | H04W 24/08 |
| 10,764,827 B2 | 9/2020 | Nimmala et al. | |
| 10,966,115 B2* | 3/2021 | Yang | H04W 40/12 |
| 11,234,178 B2* | 1/2022 | Mallikarjunan | H04W 36/14 |
| 2013/0275190 A1* | 10/2013 | Rossi | G06Q 30/0267 |
| | | | 705/26.1 |
| 2014/0101312 A1* | 4/2014 | Huang | H04L 65/613 |
| | | | 709/225 |
| 2017/0201850 A1* | 7/2017 | Raleigh | H04W 4/50 |
| 2019/0141544 A1* | 5/2019 | Karimli | H04W 28/0268 |
| 2020/0205062 A1 | 6/2020 | Azizi et al. | |

* cited by examiner getEntitlement request:

| Property | Required? | JSON Type |
|---|---|---|
| request-id | Yes | Integer |
| action-name | Yes | String |
| entitlement-names | Yes | Array of strings |

*FIG. 12A* getEntitlement response:

| Property | Required? | JSON Type |
|---|---|---|
| request-id | Yes | Integer |
| status | Yes | String |
| response | Yes | Array of objects |

*FIG. 12B*

Service-Property Object

| Property | Required? | JSON Type |
|---|---|---|
| alternate-server | No | String |
| auth-token | No | String |
| 3gpp-rat-only | No | Boolean |

*FIG. 14*

Object: response

| Property | Required? | JSON Type |
|---|---|---|
| entitlement-name | Yes | String |
| entitlement-status | Yes | Integer |
| periods-to-skip | No | Integer |
| service-property | No | Object |

*FIG. 13*

| setProvisioning request: | | |
|---|---|---|
| Property | Required? | JSON Type |
| request-id | Yes | Integer |
| action-name | Yes | String |
| provisioning-elements | Yes | Array of provisioning Element objects |

FIG. 15A

| provisioningElement Object | | |
|---|---|---|
| Property | Required? | JSON Type |
| name | Yes | String |
| state | Yes | Integer |
| duration | No | Integer |
| data | No | Array of VoWifi objects |

FIG. 15B

| | | While Using | While not Using |
|---|---|---|---|
| *App Store:* | | | |
| | Automatic Downloads - OFF | | Low |
| | Automatic Downloads - ON | | Normal |
| | App Downloads – Always Allow | High | |
| | App Downloads – Ask if Over 200 Mb | Normal | |
| | App Downloads – Always Ask | Low | |
| *Music* | | | |
| | Streaming - ON | | |
| | High Quality Streaming - ON | High | |
| | High Quality Streaming - OFF | Normal | |
| | Streaming - OFF | Low | |
| | Downloads - ON | | Normal |
| | Downloads - OFF | | Low |
| *Photos* | | | |
| | Unlimited Updates - ON | | High |
| | Unlimited Updates - OFF | | Normal |

FIG. 17

| | | |
|---|---|---|
| Video Service 1 | | |
| | Video Playback - Automatic | System Default |
| | Video Playback - WiFi Only | Low (disabled?) |
| | Video Playback – Save Data | Normal |
| | Video Playback – Maximum Data | High |
| Video Service 2 | | |
| | Stream on WiFi Only - ON | Low (disabled?) |
| | Stream on WiFi Only - OFF | Normal |
| | Streaming quality - Good | Low |
| | Streaming quality - Better | Normal |
| | Streaming quality - Best | High |

FIG. 18

| Messaging App | | |
|---|---|---|
| MEDIA AUTO-DOWNLOAD | | |
| Photos – WiFi only | | Low |
| Photos – WiFi and Cellular | | Normal |
| Audio – WiFi only | | Low |
| Audio – WiFi and Cellular | | Normal |
| Video – WiFi only | | Low |
| Video – WiFi and Cellular | | High |
| Documents – WiFi only | | Low |
| Documents – WiFi and Cellular | | Normal |
| CALL SETTINGS | | |
| Low Data Usage - ON | Low | |
| Low Data Usage - OFF | Normal | |

FIG. 19

|  | LTE | LTE/5G | 5G Plan Unknown / 5G Plan Metered | 5G Plan Unlimited |
|---|---|---|---|---|
| Video Calling Application | Bit Rate | 228 Kbps | 600 Kbps | 600 Kbps | 2 Mbps |
| | Data Use Projections | 104 MB / hour | 312 MB / hour | 312 MB / hour | ~1 GB / hour |
| Video Streaming Application | Resolution | 768x432 (XGA) | 768x432 (XGA) | 768x432 (XGA) | 2048x1152 (2K) |
| | Data Use Projections | 600 MB / hour | 600 MB / hour | 600 MB / hour | ~4 GB / hour |

*FIG. 20*

| Coverage Area | LTE only Coverage Area | 5G Coverage | | |
|---|---|---|---|---|
| | | LTE | Sub6 | mmWave |
| Underlying RAT Utilized | LTE | LTE | Sub6 | mmWave |
| Video Streaming data usage in 1 hours | 600MB (768*432 VGA resolution) | 3.9B (QWXGA) | 3.9B (QWXGA) | 3.9B (QWXGA) |
| Video Calling 15 min call data use | 78MB (600Kbps) | 268MB (2Mbps) | 268MB (2Mbps) | 268MB (2Mbps) |
| Over the Air Software Update | 7 days wait 60 MB cap (manual) | 0 days wait (unlimited) | 0 days wait (unlimited) | 0 days wait (unlimited) |
| Photo Backup | 50MB | Unlimited | Unlimited | Unlimited |
| TV next episode auto download | Not applicable | Supported | Supported | Supported |
| 3rd Party Applications | Expensive | Inexpensive | Inexpensive | Inexpensive |
| Background Tasks daily data budget | 50MB | 50MB* | 50MB* | 50MB* |

FIG. 21

HIGH DATA MODE FOR ENHANCED USER EXPERIENCE IN CELLULAR NETWORKS

PRIORITY DATA

This application is a continuation of U.S. patent application Ser. No. 16/902,966, titled "High Data Mode for Enhanced User Experience in Cellular Networks", filed Jun. 16, 2020, which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD

The invention relates to wireless devices, and more particularly to a system and method for high data mode operation in cellular networks.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR may provide a higher capacity for a higher density of mobile broadband users, also supporting device-to-device, ultra-reliable, and massive machine type communications with lower latency and/or lower battery consumption. Further, the 5G-NR may allow for more flexible UE scheduling as compared to current LTE. Consequently, efforts are being made in ongoing developments of 5G-NR to take advantage of higher throughputs possible at higher frequencies.

SUMMARY

Embodiments relate to apparatuses, systems, and methods for high data mode operation in cellular networks.

For example, in some embodiments, a user equipment device (UE) may determine, for an interface to a high-speed cellular network operating according to a first radio access technology (RAT), a categorization from a plurality of categorizations, determine availability of the high-speed cellular network, and select, based at least in part on the categorization and availability of the high-speed cellular network, the interface for a data connection to the high-speed cellular network. In some embodiments, the categorization may be one of expensive or not expensive and/or one of a first level associated with a higher compression codec rate or a second level associated with a lower compression codec rate. In some embodiments, the UE may receive, from one of the a low-speed cellular network or the high-speed cellular network, carrier plan information for a cellular data service carrier and analyze the carrier plan information to determine desirability of a switch, e.g., from the low-speed cellular network to the high-speed cellular network. In some embodiments, the desirability of the switch from the low-speed cellular network to the high-speed cellular network may s based, at least in part, on the categorization being not expensive and/or being the first level.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 12A illustrates examples of properties of a getEntitlement request command, according to some embodiments.

FIG. 12B illustrates examples of properties of a getEntitlement response command, according to some embodiments.

FIG. 13 illustrates an example of properties that may be included in a response property of a getEntitlement service object, according to some embodiments.

FIG. 14 illustrates an example of properties that may be included in a service property field, according to some embodiments.

FIG. 15A illustrates an example of properties that may be included in a "setProvisioning" request, according to some embodiments.

FIG. 15B illustrates an example of properties that may be included in a provisioning elements property of a set provisioning request, according to some embodiments.

FIGS. 17-19 illustrate examples of levels of data usage based on selection of various options for various UE applications, according to some embodiments.

FIG. 20 illustrates an example of data rate enhancements and data use projections for a video calling application and a video streaming application, according to some embodiments.

FIG. 21 illustrates an example of high data mode (HDM) behavior for a number of different types of applications over a number of different networks and bands, according to some embodiments.

Figure 1A:
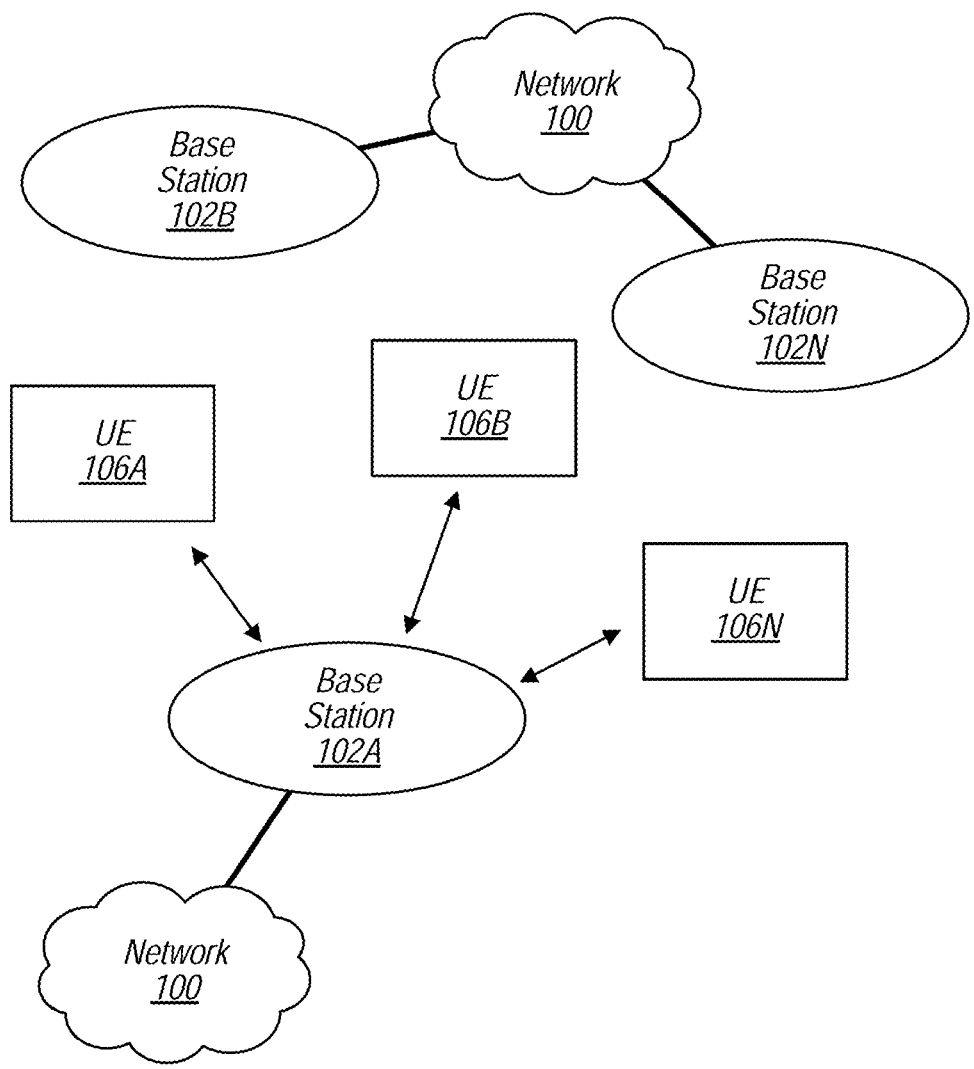
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution NR: New Radio
5GS: 5G System
5GMM: 5GS Mobility Management
5GCN: 5G Core Network
IE: Information Element Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Figure 1B:
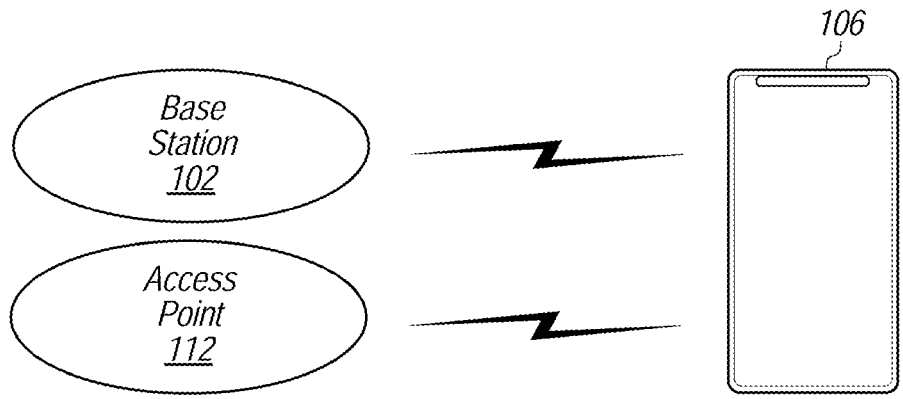
FIG. 1B illustrates an example of a base station (BS) and an access point in communication with a user equipment (UE) device according to some embodiments.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component. FIGS. 1A and 1B: Communication Systems FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHIRPD), etc. Note that if the base station 102A is implemented in the context of LTE, it may alternately be referred to as an 'eNodeB' or 'eNB'. Note that if the base station 102A is implemented in the context of 5G NR, it may alternatively be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHIRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHIRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
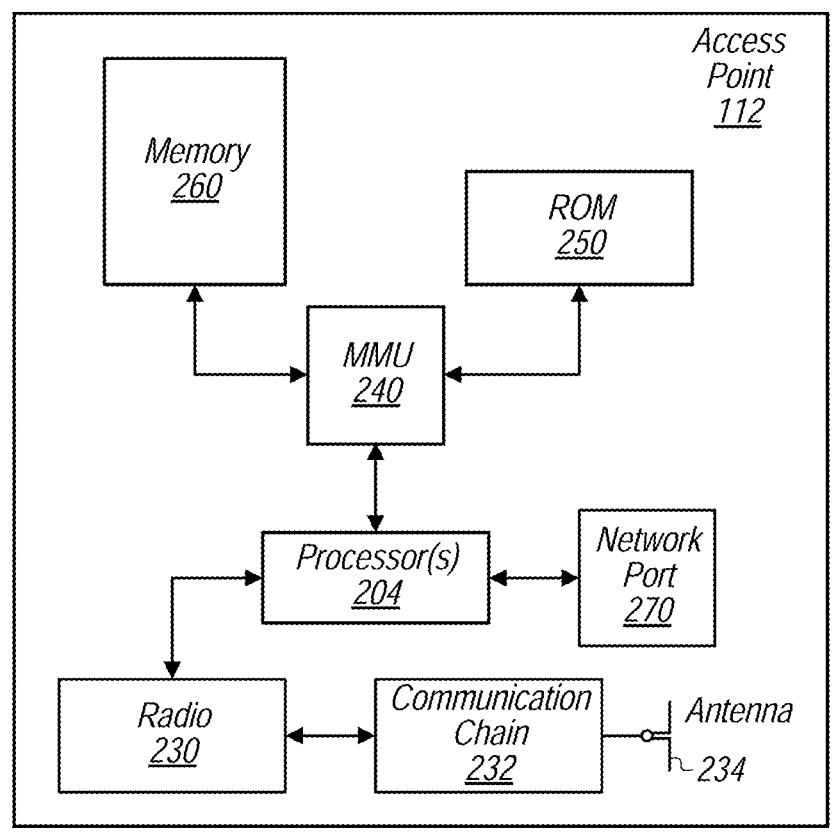
FIG. 2 illustrates an example simplified block diagram of a WLAN Access Point (AP), according to some embodiments.

FIG. 2: Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for high data mode operation in cellular networks as further described herein.

Figure 3:
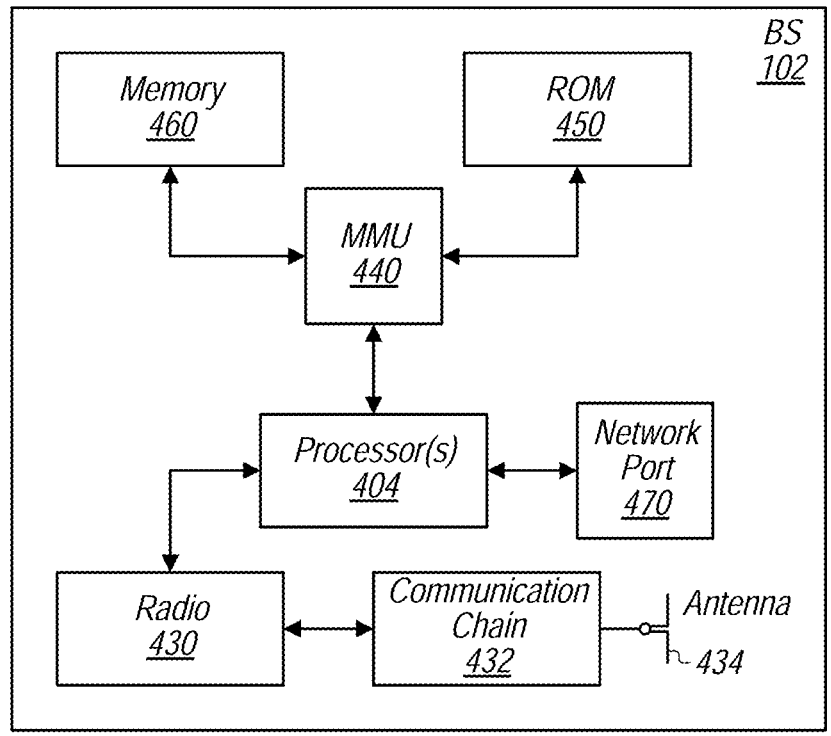
FIG. 3 illustrates an example block diagram of a BS according to some embodiments.

FIG. 3: Block Diagram of a Base Station

FIG. 3 illustrates an example block diagram of a base station 102, according to some embodiments. It is noted that the base station of FIG. 3 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the base station 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the base station 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 4:
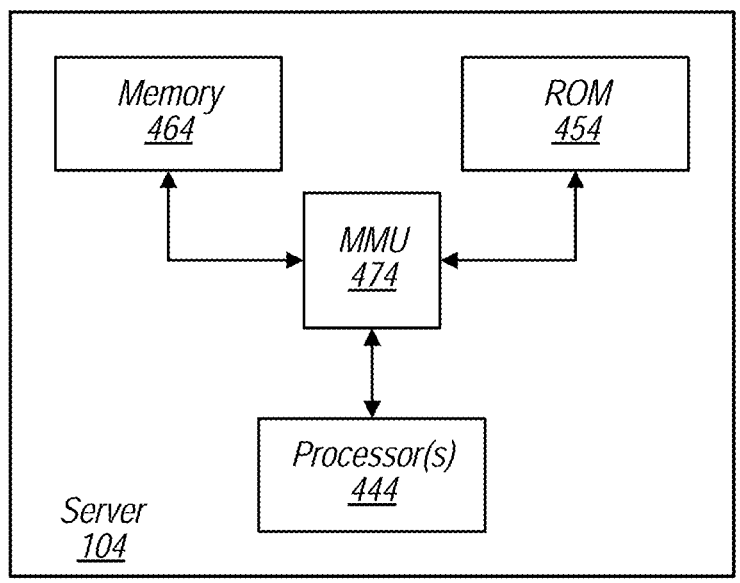
FIG. 4 illustrates an example block diagram of a server according to some embodiments.

FIG. 4: Block Diagram of a Server

FIG. 4 illustrates an example block diagram of a server 104, according to some embodiments. It is noted that the base station of FIG. 4 is merely one example of a possible server. As shown, the server 104 may include processor(s) 444 which may execute program instructions for the server 104. The processor(s) 444 may also be coupled to memory management unit (MMU) 474, which may be configured to receive addresses from the processor(s) 444 and translate those addresses to locations in memory (e.g., memory 464 and read only memory (ROM) 454) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 444 of the server 104 may be configured to implement or support implementation of part or all of the methods described herein, e.g., by executing program instructions stored on a memory medium (e.g., a non-transitory computer-readable memory medium). Alternatively, the processor 444 may be configured as a programmable hardware element, such as an FPGA (Field Programmable Gate Array), or as an ASIC (Application Specific Integrated Circuit), or a combination thereof. Alternatively (or in addition) the processor 444 of the server 104, in conjunction with one or more of the other components 454, 464, and/or 474 may be configured to implement or support implementation of part or all of the features described herein.

In addition, as described herein, processor(s) 444 may be comprised of one or more processing elements. In other words, one or more processing elements may be included in processor(s) 444. Thus, processor(s) 444 may include one or more integrated circuits (ICs) that are configured to perform the functions of processor(s) 444. In addition, each integrated circuit may include circuitry (e.g., first circuitry, second circuitry, etc.) configured to perform the functions of processor(s) 444.

Figure 5A:
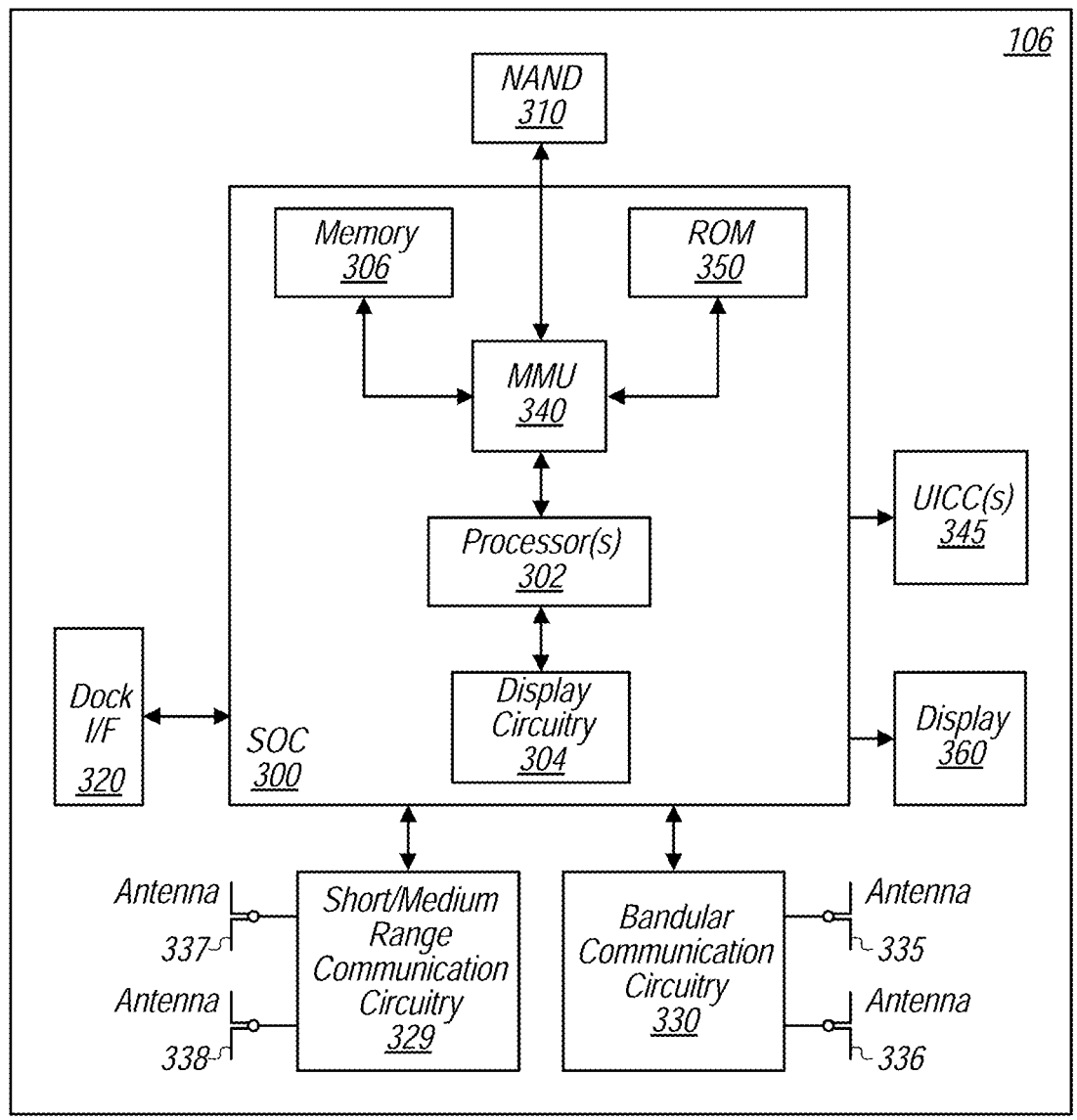
FIG. 5A illustrates an example block diagram of a UE according to some embodiments.

FIG. 5A: Block Diagram of a UE

FIG. 5A illustrates an example simplified block diagram of a communication device 106, according to some embodiments. It is noted that the block diagram of the communication device of FIG. 5A is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 310 may be implemented as a removable smart card. Thus the SIM(s) may be one or more removable smart cards (such as UICC cards, which are sometimes referred to as "SIM cards"), and/or the SIMs 310 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 310 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for high data mode operation in cellular networks as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 5B:
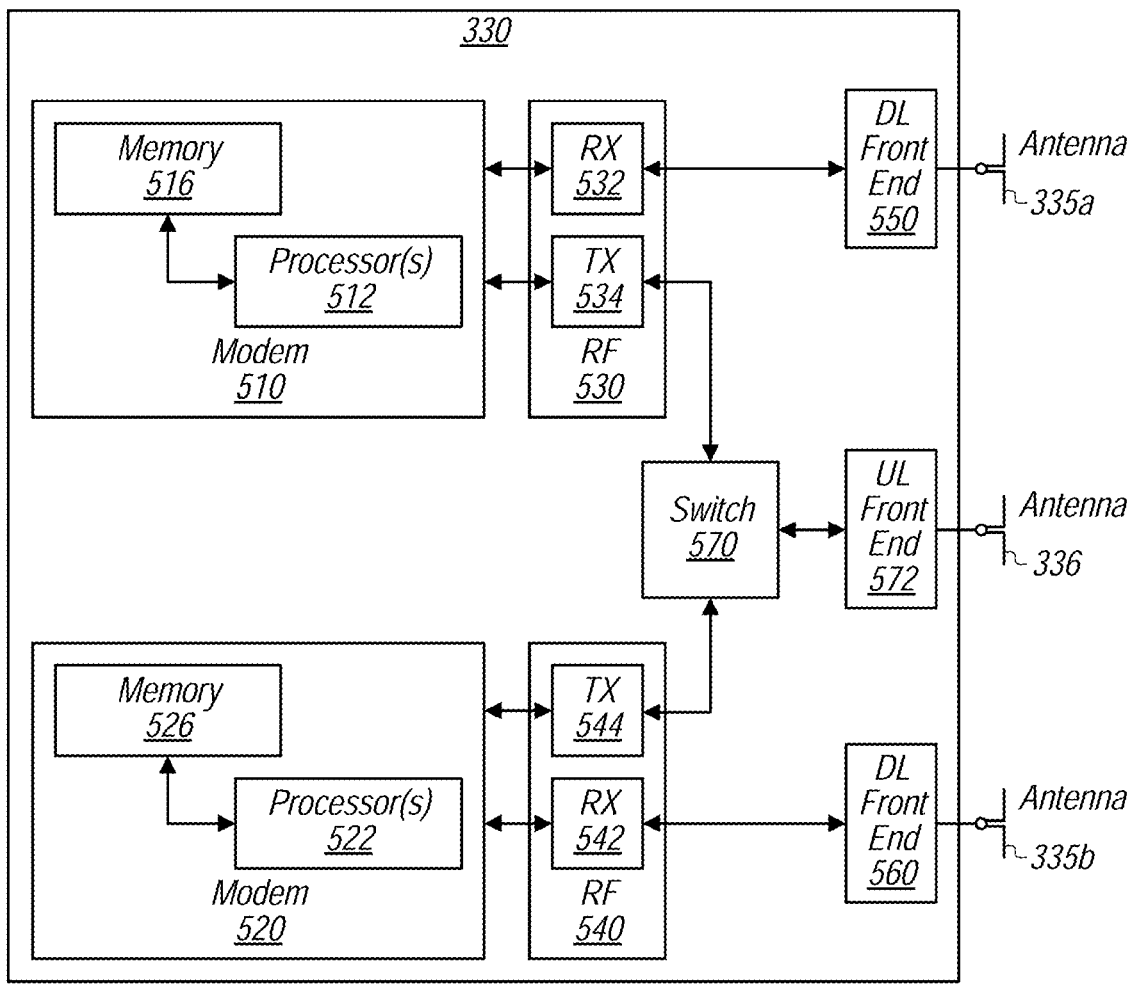
FIG. 5B illustrates an example block diagram of cellular communication circuitry, according to some embodiments.

FIG. 5B: Block Diagram of Cellular Communication Circuitry

FIG. 5B illustrates an example simplified block diagram of cellular communication circuitry, according to some embodiments. It is noted that the block diagram of the cellular communication circuitry of FIG. 5B is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods for high data mode operation in cellular networks as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
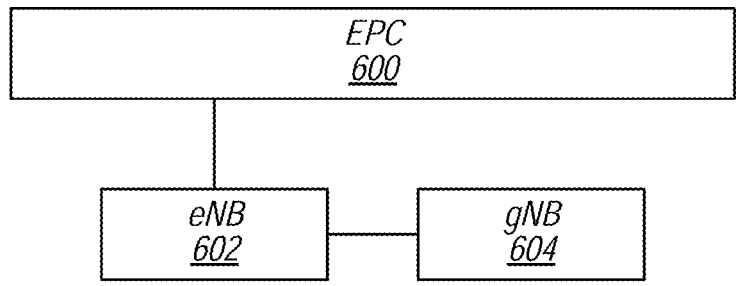
FIG. 6A illustrates an example of connections between an EPC network, an LTE base station (eNB), and a 5G NR base station (gNB).
Figure 6B:
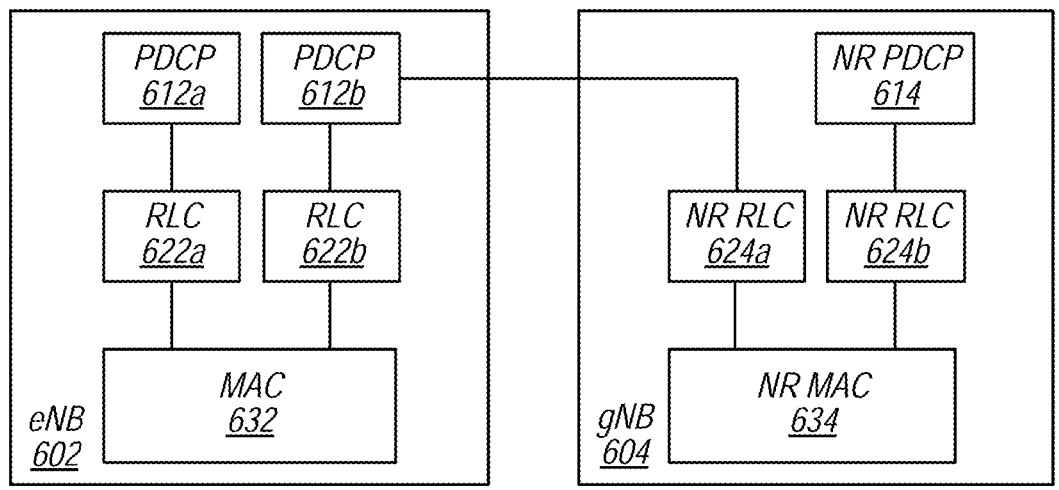
FIG. 6B illustrates an example of a protocol stack for an eNB and a gNB.

FIGS. 6A and 6B: 5G NR Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Figure 7A:
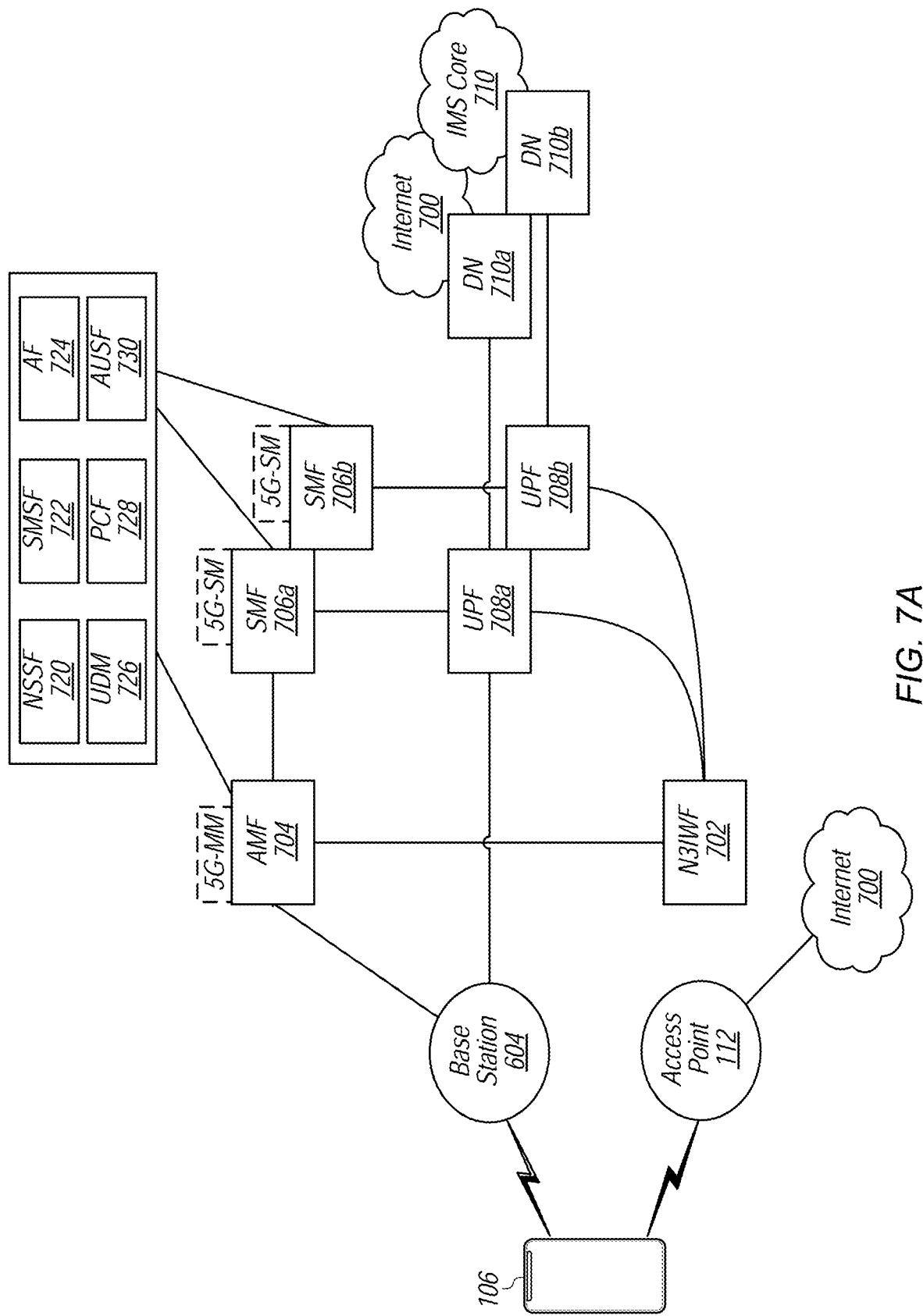
FIG. 7A illustrates an example of a 5G network architecture that incorporates both 3GPP (e.g., cellular) and non-3GPP (e.g., non-cellular) access to the 5G CN, according to some embodiments.
Figure 7B:
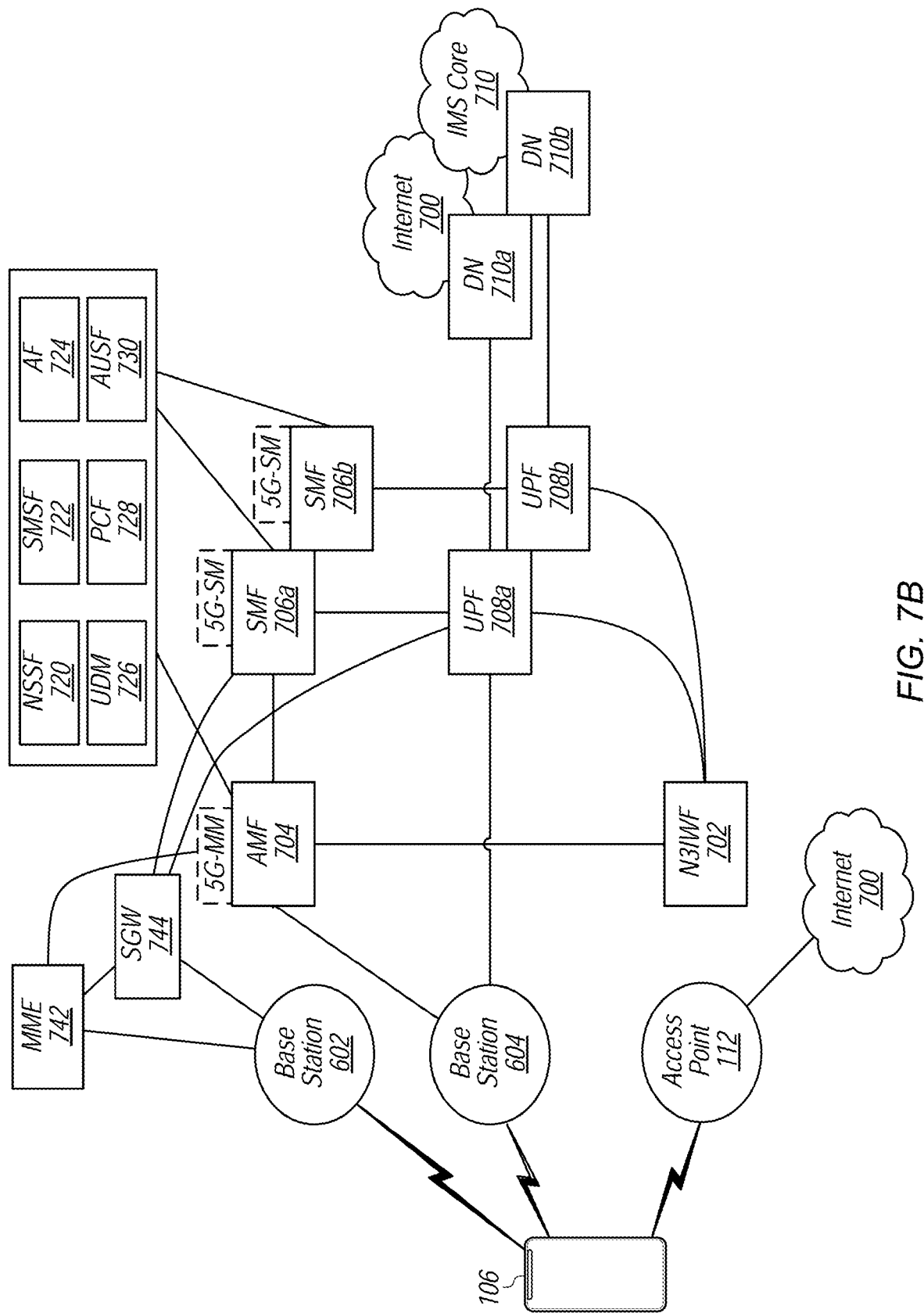
FIG. 7B illustrates an example of a 5G network architecture that incorporates both dual 3GPP (e.g., LTE and 5G NR) access and non-3GPP access to the 5G CN, according to some embodiments.
Figure 8:
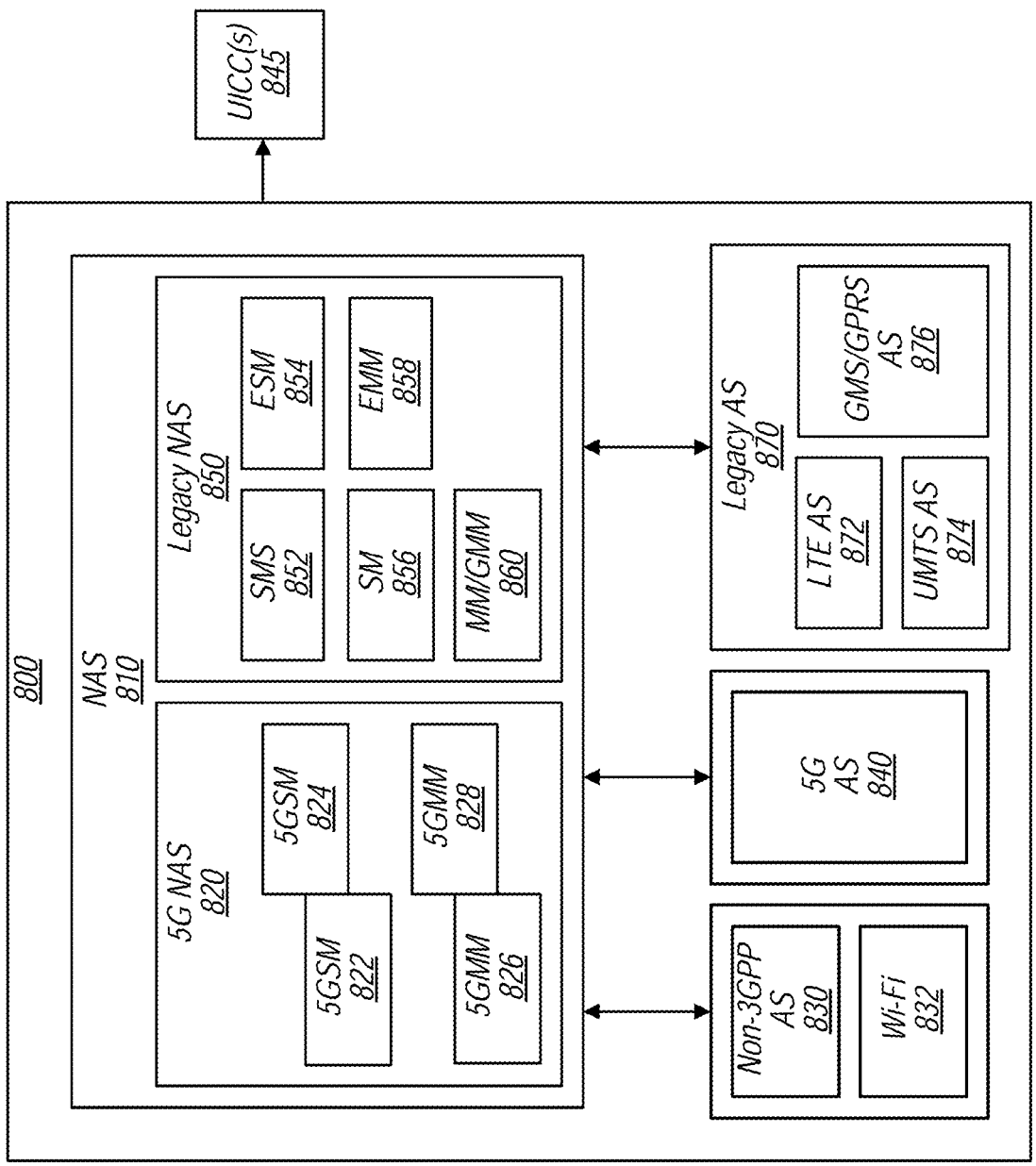
FIG. 8 illustrates an example of a baseband processor architecture for a UE, according to some embodiments.

FIGS. 7A, 7B and 8: 5G Core Network Architecture— Interworking with Wi-Fi

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to improve security checks in a 5G NR network, including mechanisms for high data mode operation in cellular networks e.g., as further described herein.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods for high data mode operation in cellular networks e.g., as further described herein.

High Data Mode

In current implementations, 5G networks are initially being deployed in various geographic locations around the world in standalone and (SA) and non-standalone (NSA) architectures. For example, South Korea is deploying 5G SA networks, e.g., the 5G networks operate independently from other networks, such as 4G networks or 3G networks. However, a majority of initial deployments of 5G networks, such as many deployments in the United States, are non-standalone (NSA), e.g., the 5G network may be aided by existing 4G infrastructure. As 5G SA and 5G NSA networks become more commonplace, it has become desirable to users to take advantage of the ultrafast data speeds and high data quality offered by 5G networks.

However, availability of 5G services varies depending on the geographic location of a user equipment device (UE) at a given moment. For example, 5G networks are more prevalent in urban areas than in rural areas. As a result, UE technology that may allow a UE to "switch" from using legacy network (e.g., such as 4G LTE) to using a 5G network should be capable of determining the presence of 5G services in a geographic area.

In addition, a UE generally accesses a cellular network through a pre-existing contract between the owner of the UE and a cellular data service carrier. The contract may specify that in exchange for a monthly fee paid for by an owner, the UE may consume unlimited cellular data per month. This first type of contract is known as an "unlimited plan". Alternatively, the contract may specify that in exchange for a monthly fee paid for by an owner, the UE may consume a finite amount of cellular data per month, (for example, 8 GB or 12 GB), at no additional cost. This second type of contract is known as a "limited plan", or more specifically, as a "8 GB plan" or a 12 GB plan", for example, depending on the selected monthly data threshold. Under the terms of a limited plan, however, any additional data consumed beyond the specified threshold is subject to additional fees to be paid by the owner.

Further, there are many UEs that provide a 5G cellular interface but are designed to be used on an older network, e.g., 4G LTE, by default. This default setting can be desirable to users having a "limited plan" as this setting has the effect of limiting the amount of data consumed by the UE over a given period of time. However, there are certain situations where restriction to an older network may be undesirable to a user having a "limited plan". For example, a user may historically consume a much lower amount of monthly data than the amount allotted by the plan and would not suffer a financial penalty by the occasional, or frequent, use of a 5G network. As well, a user may be in a situation where a monthly data threshold has been reached or nearly reached, but may be happy to pay the additional monthly fee in exchange for the enhanced speed and quality provided by a 5G network at that particular time and place. As a result, it is desirable to provide an improved system and method for both dynamically switching and for manually switching from a first network to a 5G network, as well as a system and method for activating and deactivating this switching.

Additionally, a UE may categorize interface types (e.g. 4G LTE, 5G NR) as "expensive" or "not expensive" and may provide this categorization information to the user. A 5G NR network may be categorized as "expensive", which may serve as a deterrent to the user to switch from a lower quality network to a 5G network, even if the user has a significant amount of monthly data remaining on a "limited plan". As well, an "expensive" categorization may have the effect of lowering the quality of a codec rate of data received through a corresponding interface. Therefore, should a user switch to a 5G NR interface categorized as "expensive", the user may not experience the full capabilities of the 5G NR network, as, unknown to the user, a lower quality codec rate may be used.

In order to provide accessibility to higher data rates offered by 5G NR, a "High Data Mode" or "High While on 5G" feature is defined. "High Data Mode" or "High While of 5G" maintains a "not expensive" cost categorization for 5G networks from the perspective of a UE.

Several factors determine the desirability, to a user, of switching from a legacy network to a 5G NR network, and from a 5G NR network back to a legacy network. These factors include network availability, entitlement to network services, the traffic shaping capabilities of the plan, the throttling thresholds of the plan, historical use information and whether a user has a limited plan or an unlimited plan. If the user has a limited plan, the size of the plan and the amount of remaining monthly data in the plan are also factors in the determination.

Within the parameters of a particular data plan, cellular data carriers seek to provide their customers with the greatest possible online experience. In the present context, the highest possible online experience includes the ultrafast speeds and high quality of a 5G NR network. As it is impractical for each user to dynamically determine and control his optimal network experience, it is desirable to the carrier to have a system and method for dynamically managing the network use of a UE.

Embodiments described herein include systems, methods and mechanisms for dynamically switching from a first network (e.g., a legacy network such as LTE) to a 5G network (e.g., such as a 5G New Radio (NR) network). Additionally, embodiments described herein further include systems, methods, and mechanisms for activating and deactivating the switching. Further, embodiments described herein further include systems, methods, and mechanisms for a carrier information protocol.

In some embodiments, an option of maintaining a "not expensive" categorization of a 5G NR interface (e.g., a 5G cellular interface) at the UE may be provided, e.g., in order to provide a user with the full capabilities (e.g., higher data rates, lower latency) of a 5G NR network. In some embodiments, a cellular data service carrier may dynamically manage switching to and/or from a legacy network and a 5G NR network, e.g., in order to allow a UE to use a 5G NR network as much as possible without exceeding a monthly data threshold of an associated data plan.

In some embodiments, when a UE, such as UE 106, is in a 5G NSA idle mode, the UE may access a lower-speed network, for example, an LTE network. In some embodiments, an application of the UE may seek to categorize a "High Data Mode" selection as "expensive". As previously described, a cost categorization of "expensive" may have the effect of lowering a quality of a codec rate of data received through a corresponding interface. Note that lowering the quality of the codec rate of data receive through the corresponding interface may result in a user not experiencing the full capabilities of an available high-speed network. In other words, the UE may not benefit from higher data rates (e.g., faster download speeds) of the available high-speed network. In some embodiments, in order to counteract a cost categorization of "expensive", the 5G cellular interface may be marked as "inexpensive" based on system information block 2 (SIB2), e.g., via a user level information parameter. In some embodiments, marking and/or flagging the 5G cellular interface as "inexpensive" or "not expensive" may allow the 5G cellular interface to maintain a cost categorization of "inexpensive" irrespective of whether the UE is in idle mode or in connected mode. In some embodiments, when in a connected mode, the network may add a secondary cell group (SCG) bearer based on the measurements reported by the network using a B1 measurement report. Note that a bearer may be a concatenated tunnel that may connect the UE to a packet data network (PDN) via a packet data network gateway (P-GW).

In some embodiments, a carrier information protocol between the UE and the network may allow a cellular data service carrier to provide information about a contract (e.g., subscription and/or data plan) between the cellular data service carrier and an owner of the UE. In some embodiments, the carrier information protocol may allow exchange of information associated with the contract, e.g., such as whether the contract entitles a UE to 5G service, whether the contract is an unlimited plan (e.g., with and/or without data caps and/or data limits) or a limited plan, a data plan size of the contract, data caps associated with the contract, historical data usage associated with the UE (e.g., amounts of monthly unused data), and/or throttling thresholds.

In some embodiments, data caps may include monthly limits on the amount of data that may be used through a cellular data service. Once a data cap has been reached, a contract may specify for a reduction of data speeds at the UE, additional plan fees, and/or disconnecting of service. In some embodiments, a UE may, based, at least in part, on the exchanged information, dynamically control switching to and/or from a legacy network from and/or to a 5G NR network, e.g., to maximize a user's experience while avoiding exceeding a contract threshold (e.g., to avoid incurring additional charges associated with a contract and/or to avoid exceeding data limits (e.g., throttling thresholds) that may trigger throttling of a UE's data connection, such as slowing a UE's data connection to reduce data consumption. The carrier information protocol may allow a cellular data carrier to redirect the management of one or more services of a user's data plan to an alternate server. An example of a service that may be managed by an alternate server is "traffic shaping". In some embodiments, traffic shaping may be performed by a carrier protocol server or by a service-based alternate server, and may include application-based traffic shaping.

In some embodiments, a traffic shaping feature deployed by a carrier may provide for streaming traffic to be compressed using a higher compression codec, thus limiting a user's data consumption for streaming applications. In some embodiments, a carrier information protocol may allow a UE to discover whether traffic shaping is deployed as part of a user's data plan. In some embodiments, if (and/or when) traffic shaping is deployed, such a feature may allow traffic shaping to be disabled in certain situations, e.g., such as when a UE is using mmWave and/or performing streaming operations.

In some embodiments, a carrier protocol server may exchange messaging with a UE, such as UE 106 via a carrier information protocol. For example, the carrier protocol server may cause the UE (e.g., via indications and/or instructions received via the carrier information protocol) to provide a "pop-up" directed to a user (e.g., via a user interface of the UE) asking if the user would like to enable High Data Mode at a particular time.

Figure 9:
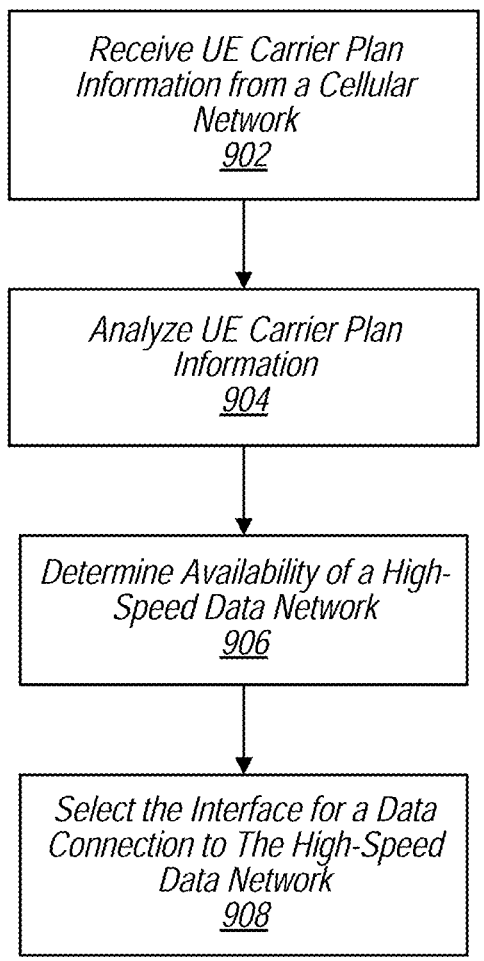
FIG. 9 illustrates a block diagram of an example of a method for switching from a low-speed data network to a high-speed data network, according to some embodiments.

FIG. 9 illustrates a block diagram of an example of a method for switching from a low-speed data network to a high-speed data network, according to some embodiments. The method shown in FIG. 9 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 902, a UE, such as UE 106, may receive UE carrier plan information from a cellular network, e.g., from a base station, such as base station 102, and/or a server of the network, such as server 104. In some embodiments, the UE carrier plan information may include information about a contract between cellular data service carrier (e.g., a supplier of the cellular data service) and an owner of the UE. In some embodiments, information about the contract may include, for example, whether the contract entitles the UE to high-speed cellular network service(s), whether the contract is an unlimited plan or a limited plan, a data plan size of the contract, historical data usage associated with the UE (e.g., amounts of monthly used data), and/or throttling thresholds.

At 904, the UE may analyze the UE carrier plan information to determine whether a switch to a high speed-data network would be desirable (e.g., whether the UE may benefit, e.g., in terms of data download rate and/or latency from a switch to the high speed-data network). In some embodiments, the UE may seek to maximize a user's experience by selecting a high-speed cellular network when penalties for doing so may be avoided. In some embodiments, penalties may include issuance of additional charges associated with exceeding a contract threshold (e.g., such as data limit thresholds) and/or throttling and/or slowing down of a UE's data connection (e.g., download data rate) as a result of exceeding throttling thresholds.

At 906, the UE may determine an availability of a high-speed data network in the UE's present geographic location. In some embodiments, the determination may be based, at least in part, on the UE carrier plan information.

At 908, the UE may select an interface for a data connection to the high-speed data network. In some embodiments, the selection may be based, at least in part, on the UE's analyses.

In some embodiments, a carrier information protocol may allow a UE, such as UE 106, to receive information about a contract (e.g., subscription and/or data plan) associated with the UE from the network. The contract may be between a cellular data service carrier and an owner/user of the UE. For example, the carrier information protocol may enable exchange of information associated with the contract between the UE and the network, e.g., a network entity, such as a server residing within the network. In some embodiments, the information associated with the contract may include information such as whether the contract entitles a UE to 5G service, whether the contract is an unlimited plan (e.g., with and/or without data caps and/or data limits) or a limited plan, a data plan size of the contract, data caps associated with the contract, historical data usage associated with the UE (e.g., amounts of monthly unused data), and/or throttling thresholds.

In some embodiments, information provided through a carrier information protocol by a cellular data service carrier to a UE, such as UE 106, may include instructions to redirect management of a particular data plan feature to one or more service-based alternate servers. In this way, a carrier may deploy different endpoints to manage specific features of a data plan. An example of a data plan feature that may be redirected in this way is data-saving.

Figure 10:
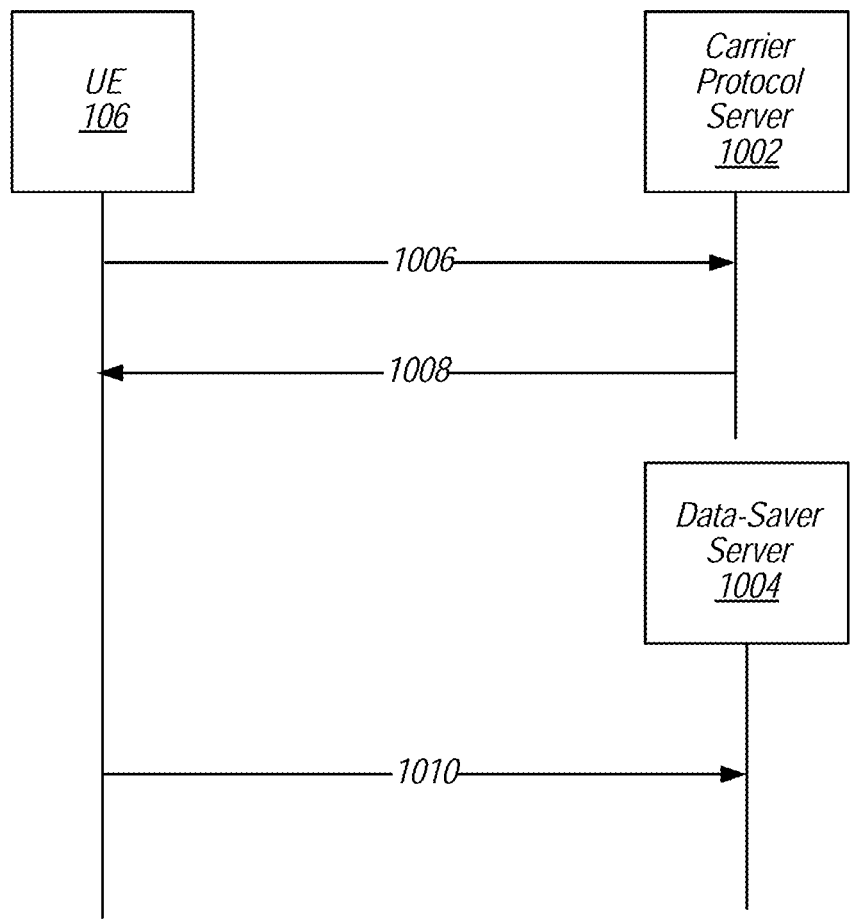
FIG. 10 illustrates an example of signaling for redirection of a UE to a service-based alternate server, according to some embodiments.

For example, FIG. 10 illustrates an example of signaling for redirection of a UE to a service-based alternate server, according to some embodiments. The signaling shown in FIG. 10 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

As shown, a UE, such as UE 106 may be in communication with a first server of a network, such as carrier protocol server 1002, which may be a server 104. In some embodiment, the carrier protocol server 1002 may redirect the UE to a second server of the network, e.g., based on a requested service. In some embodiments, the communication may be via a carrier information protocol.

For example, at 1006, the UE may initiate communication with carrier protocol server 1002 through the carrier information protocol to determine whether a carrier plan of the UE provides for usage of a data-saver service. In some embodiments, the communication may include the UE sending a request to carrier protocol server 1002. In some embodiments, the request may include an indication of a requested service. In some embodiments, the request may be a getEntitlement request message.

At 1008, carrier protocol server 1002 may respond to the UE indicating whether the carrier plan provides for usage of the data-saving service. In some embodiments, when the carrier plan provides for the usage of the data-saver service, carrier protocol server 1002 may provide an indication of a server supporting the data-saver service, e.g., such as data-saver server 1004, which may be a server 104. In some embodiments, information provided by the carrier protocol server 1002 may also include whether service management may occur over cellular networks only, allowing the carrier to perform cellular-based authentication and removing the need for token-based authentication by data-saver server 1004. In some embodiments, the information may be provided via a response message. In some embodiments, the response message may be a getEntitlement response message. In some embodiments, the UE may retrieve data-saver server 1004 to manage the data-saver service. Additionally, in some embodiments, the UE may display a message to a user indicating that the network may perform data-saving which may affect 5G experience.

At 1010, the UE may connect to data-saver server 1004. In some embodiments, the UE may connect to data-saver server 1004 via a provisioning request. In some embodiments, the provisioning request may include an indication of the service. In some embodiments, the provisioning request may be a setProvisioning message.

In some embodiments, once data-saver server 1004 has been identified, communication may occur between a UE, such as UE 106, and data-saver server 1004. In some embodiments, communication may continue to occur between the UE and data-saver server 1004 until the UE receives a requirement to disable the service provided by data-saver server 1004. In some embodiments, upon receipt of such a requirement, the UE may signal the network.

Figure 11:
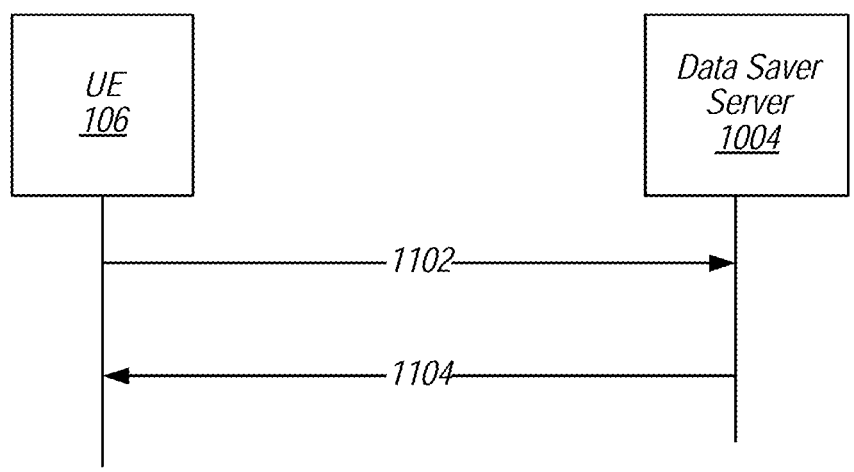
FIG. 11 illustrates an example of signaling for a UE to enable and/or disable a data-saver service, according to some embodiments.

For example, FIG. 11 illustrates an example of signaling for a UE to enable and/or disable a data-saver service, according to some embodiments. The signaling shown in FIG. 11 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

As shown, a UE, such as UE 106, may send a request 1102 to data-saver server 1004 to disable the service. In some embodiments, the request may be sent via a carrier information protocol. In some embodiments, request 1102 may be a setProvisioning request message. In some embodiments, request 1102 may include an indication of a service (e.g., data-saver service) and/or an indication to disable and/or enable the service.

At 1104, data-saver server 1004 may send response 1104 to the UE. In some embodiments, the response may be a setProvisioning response message. In some embodiments, the response may be received via the carrier information protocol. In some embodiments, the response message may include a status of the request, e.g., whether the request to disable/enable a service is successful.

In some embodiments, a getEntitlement request command may include one or more properties associated with a service. For example, FIG. 12A illustrates examples of properties of a getEntitlement request command, according to some embodiments. As shown, properties may include one or more of (e.g., at least one of and/or any, any combination of, and/or all of) a request identifier, e.g., "request-id", an action name, e.g., "action-name", and/or entitlement names, e.g., "entitlement-names". In some embodiments, the request identifier may identify a particular action and may be unique within a request. In some embodiments, the request identifier may have a JavaScript Object Notation (JSON) data type of number. In some embodiments, the number may be an integer, e.g., as shown in FIG. 12A. In some embodiments, the action name may have a value of getEntitlement. In some embodiments, the action name may have a JSON data type of string, e.g., as shown in FIG. 12A. In some embodiments, the entitlement names may have a value of "stream-saver". In some embodiments, entitlement names may have a JSON data type of array. In some embodiments, the array, may be an array of strings, e.g., as shown in FIG. 12A. In some embodiments, a request identifier, an action name, and entitlement-names may be required properties and/or parameters, e.g., as shown in FIG. 12A. Note that in other embodiments, one or more of the properties may be optional.

In some embodiments, a getEntitlement response command may include one or more properties associated with a service. For example, FIG. 12B illustrates examples of properties of a getEntitlement response command, according to some embodiments. In some embodiments, properties may include one or more of (e.g., at least one of and/or any, any combination of, and/or all of) a request identifier, e.g., "request-id", a status, e.g., "status" and/or a response, e.g., "response". In some embodiments, the request identifier may match a request identifier for which the response applies and/or maybe unique within the response. In some embodiments, the request identifier may have a JSON data type of number. In some embodiments, the number may be an integer, e.g., as shown in FIG. 12B. In some embodiments, the status may have a value of success, e.g., "STATUS_SUCCESS", disallowed, e.g., "STATUS_DISALLOWED_ACTION", unknown device, e.g., "STATUS_UNKNOWN_DEVICE", and/or unknown subscriber, e.g., "STATUS_UNKNOWN_SUBSCRIBER". In some embodiments, the status may have a JSON data type of string, e.g., as shown in FIG. 12B. In some embodiments, the response may have a value of an array of objects. In some embodiments, the response may have a JSON data type of array. In some embodiments, the array, may be an array of JSON objects, e.g., as shown in FIG. 12B. In some embodiments, a request identifier, a status, and a response may be required properties and/or parameters, e.g., as shown in FIG. 12B. Note that in other embodiments, one or more of the properties may be optional.

FIG. 13 illustrates an example of properties that may be included in a response property of a getEntitlement service object, according to some embodiments. As shown, properties of the object response may include one or more of (e.g., at least one of and/or any, any combination of, and/or all of) an entitlement name, e.g., "entitlement-name", an entitlement status, e.g., "entitlement-status", periods to skip, e.g., "periods-to-skip", and/or service property, e.g., "service-property". In some embodiments, the entitlement name property may have a value of "stream saver". In some embodiments, entitlement name may have a JSON data type of string. In some embodiments, the entitlement status property may have one or more values indicating a status of the entitlement, e.g., such as enabled or invalid. For example, as shown in FIG. 13, the entitlement status property may a value of "STATUS_ENABLED_ENTITLEMENT" or "STATUS_INVALID_ENTITLEMENT". In some embodiments, entitlement status may have a JSON data type of number. In some embodiments, the number may be an integer. In some embodiments, values of the integer may be mapped to status states, e.g., as illustrated by FIG. 13. For example, a first integer value may indicate that the entitlement is enabled, a second integer value may indicate that the entitlement is invalid, and so forth. In some embodiments, the periods to skip property may indicate that a service represented in the entitlement name property may not be queried for a number of periods as indicated by the property. For example, when a value of the periods to skip property is 10 and a UE is configured to query for entitlement periodically (e.g., every 6 hours, every 12 hours, every 24 hours, every 48 hours, and so forth), the periodicity of the query for service represented by the entitlement name property may be increased by a factor of 10 (e.g., every 60 hours, every 120 hours, every 240 hours, every 480 hours, and so forth). In other words, the periods to skip may increase a configured query period by a factor specified by the property. In some embodiments, periods to skip may be an optional property. In some embodiments, periods to skip may have a JSON data type of number. In some embodiments, the number may be an integer, e.g., as shown in FIG. 13. In some embodiments, after an out-of-service (OOS) condition (e.g., upon a UE boot up, upon UE restart, upon UE power on, after a SIM swap, and/or a device reset (e.g., "Erase All Content and Settings"), a UE may query all entitled services and a server may return the periods to skip property parameter for each entitled service (if and/or when applicable). In some embodiments, the service property may provide service-related information. In some embodiments, service property may be an optional property. In some embodiments, service property may have a JSON data type of object, e.g., as shown in FIG. 13. In some embodiments, an entitlement name and an entitlement status may be required properties and/or parameters, e.g., as shown in FIG. 13. Note that in other embodiments, entitlement name and entitlement status may be optional properties and/or parameters.

FIG. 14 illustrates an example of properties that may be included in a service property field, according to some embodiments. As shown, properties may include one or more of (e.g., at least one of and/or any, any combination of, and/or all of) an alternate server, e.g., "alternate-server", an authentication token, e.g., "auth-token", and/or cellular bearer only, e.g., "3gpp-rat-only". In some embodiments, the alternate server property may include a Fully Qualified Domain Name (FQDN) of an alternate server to handle a request for an indicated service. In some embodiments, for a requested service, the alternate server property may include a value indicating (e.g., an FQDN) a server endpoint to receive a request for the requested service. For example, for a stream saver service, e.g., "stream-saver", the alternate server property may include a value indicating an alternate entitlement server and/or a different function/server in a carrier's network. In some embodiments, the alternate server property may be optional. In some embodiments, alternate server may have a JSON data type of string, e.g., as shown in FIG. 14. In some embodiments, the authentication token property may be a self-contained property and/or attribute which may be used to perform authentication of a request. For example, the authentication token may be self-contained to avoid communication between an entitlement server and the alternate server. In some embodiments, the authentication token property may be optional. In some embodiments, authentication token may have a JSON data type of string, e.g., as shown in FIG. 14. In some embodiments, the cellular bearer only property (e.g., "3gpp-rat-only") may indicate that a request for the alternate server must be performed over a cellular bearer, e.g., when a value of the cellular bearer only property is set to "true". In some embodiments, carriers who support cellular based authentication may return this attribute as authentication may be performed based on the access being done via a cellular bearer. In some embodiments, the cellular bearer only property may be optional. In some embodiments, cellular bearer only may have a JSON data type of Boolean, e.g., as shown in FIG. 14.

FIG. 15A illustrates an example of properties that may be included in a "setProvisioning" request, according to some embodiments. As shown, properties may include one or more of (e.g., at least one of and/or any, any combination of, and/or all of) a request identifier, e.g., "request-id", an action name, e.g., "action-name", and/or provisioning elements, e.g., "provisioning elements". In some embodiments, the request identifier property may identify a particular action and may be unique within a request. In some embodiments, request identifier may have a JSON data type of number. In some embodiments, the number may be an integer, e.g., as shown in FIG. 15A. In some embodiments, the action name property may have values associated with actions, e.g., such as set provisioning, among other actions. In some embodiments, action name may have a JSON data type of string, e.g., as shown in FIG. 15A. In some embodiments, the provisioning elements property may identify a service to be enabled and/or disabled. In some embodiments, disabling a service may not mean removing the entitlement for a UE, but rather temporarily turning off a feature for the UE. For example, "stream-saver" may be disabled and/or enabled by a UE, e.g., provided a user's account associated with the UE is eligible for a stream-saver service. In some embodiments, provisioning elements may have a JSON data type of array. In some embodiments, the array may be an array of objects, e.g., such as provisioning element objects as shown in FIG. 15A. In some embodiments, a request identifier, an action name, and provision elements may be required properties and/or parameters, e.g., as shown in FIG. 15A. Note that in other embodiments, request identifier, action name, and provision elements may be optional properties and/or parameters.

FIG. 15B illustrates an example of properties that may be included in a provisioning elements property of a set provisioning request, according to some embodiments. As shown, properties may include one or more of (e.g., at least one of and/or any, any combination of, and/or all of) a name, e.g., "name", a state, e.g., "state", a duration, e.g., "duration" and/or data, e.g., "data". In some embodiments, the name property may indicate a service name, e.g., such as "stream saver". In some embodiments, name may have a JSON data type of string, e.g., as shown in FIG. 15B. In some embodiments, the state property may indicate whether to enable or disable a service. For example, a value of "0" may indicate disablement of the server and/or a value of "1" may indicate enablement of a service. Note that other values may indicate other states of the service, such as suspended, invalid, valid, and so forth. In some embodiments, state may have a JSON data type of number. In some embodiments the number may be an integer, e.g., as illustrated by FIG. 15B. In some embodiments, the duration property may indicate a time period of enablement or disablement of the service. In some embodiments, a server may send a push notification (e.g., indicating a provisioning change) when a service state of the service changes from disabled to enabled and/or from enabled to disabled. In some embodiments, the duration property may be optional. In such embodiments, when the duration property is not specified, the network may determine how long a service will be disabled and/or enabled. In some embodiments, duration may have a JSON data type of number. In some embodiments the number may be an integer, e.g., as illustrated by FIG. 15B. In some embodiments, the data property may indicate Voice over WiFi (VoWiFi) objects. In some embodiments, the data property may be optional. In some embodiments, data may have a JSON data type of array. In some embodiments, the array may be an array of objects. In some embodiments, the objects may be VoWiFi objects, e.g., as illustrated by FIG. 15B. In some embodiments, a name and state may be required properties and/or parameters, e.g., as shown in FIG. 15B. Note that in other embodiments, name and state may be optional properties and/or parameters.

Figures 16A, 16B, 16C:
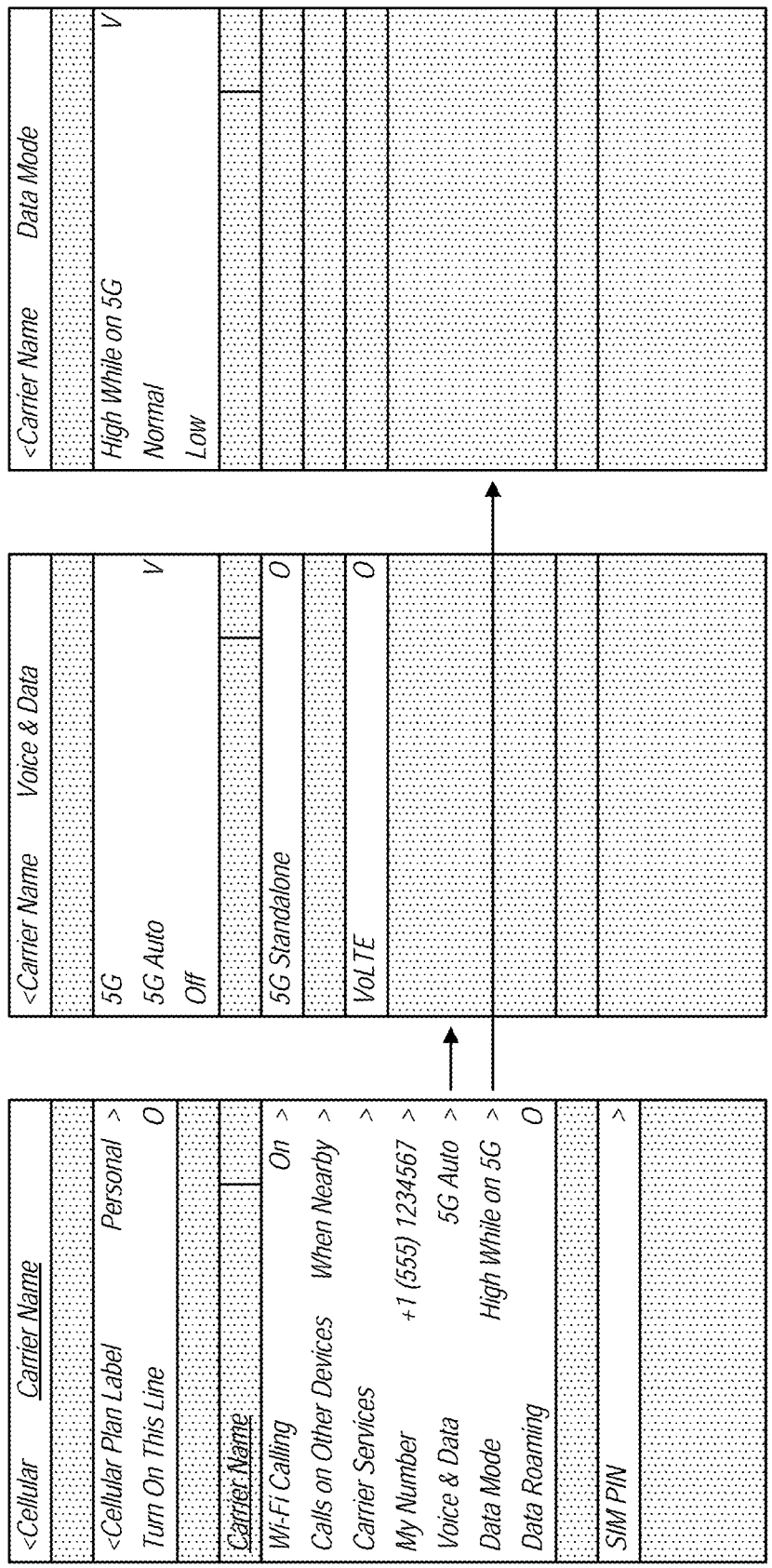
FIG. 16A illustrates an example of a first user interface for selection of network connections settings, according to some embodiments.
FIG. 16B illustrates an example of a second user interface associated with selection of voice and data settings from the first user interface, according to some embodiments.
FIG. 16C illustrates an example of a third user interface associated with selection of data mode from the first user interface, according to some embodiments.

FIGS. 16A-C illustrate an example of a Network Connections Settings user interface, according to some embodiments. In some embodiments, such a user interface, which may be displayed via a display of a UE, such as UE 106, may allow a user to enable and/or disable (e.g., select) various data modes, where a data mode may be associated with a data download rate and/or level. For example, FIG. 16A illustrates an example of a first user interface for selection of network connections settings, according to some embodiments. As shown, the first user interface may display various information, such as carrier name, cellular plan categorization (e.g., personal, business, and so forth), an option to access a further user interface to turn on a particular line (e.g., activate a particular SIM associated with a particular line or phone number), an option to access a further user interface associated with Wi-Fi calling, an option to access a further user interface associated with receiving calls on other devices, an option to access a further user interface associated with carrier services, an option to access a further user interface associated with phone numbers associated with the UE, an option to access a further user interface associated with voice and data settings, an option to access a further user interface associated with a data mode, an option to access a further user interface associated with data roaming, and/or an option to access a further user interface associated with a SIM personal identification number (PIN).

FIG. 16B illustrates an example of a second user interface associated with selection of voice and data settings from the first user interface, according to some embodiments. As shown, the second user interface may display various information, such as options for selecting a 5G state. For example, selecting "5G Auto" may provide for 5G power saving to be active. In some embodiments, 5G power savings may enable the UE to switch back to 4G LTE to save power when appropriate. As another example, selecting "Off" may disable 5G whereas selection 5G may enable 5G without enabling the UE to switch back to 4G LTE to save power when appropriate. In addition, the second user interface may provide an option of selecting a 5G standalone mode of operation as well as selecting VoLTE. In some embodiments, "Off" is selected, the 5G Standalone option may disappear (e.g., be removed from the second user interface).

FIG. 16C illustrates an example of a third user interface associated with selection of data mode from the first user interface, according to some embodiments. As shown, the third user interface may display various information, such as options for selecting a data mode. For example, selecting "High While on 5G" may indicate that a 5G cellular interface has been categorized as "not expensive", thus enabling a high-quality codec rate to be consistently used when accessing a 5G network. In some embodiments, if and/or when a carrier provides information to the UE indicating that a data plan is "unlimited", the "Data Mode" may be fixed at the "High While on 5G" setting and the "Data Mode" option of the first user interface may be removed to avoid the option being accessed by a user. Additionally, in some embodiments, selections for data mode may also include normal and/or low, as shown in FIG. 16C. Note that such selections may categorize the 5G cellular interface as "expensive", thus disabling a high-quality codec rate from being used when accessing a 5G network.

Figures 16D, 16E, 16F:
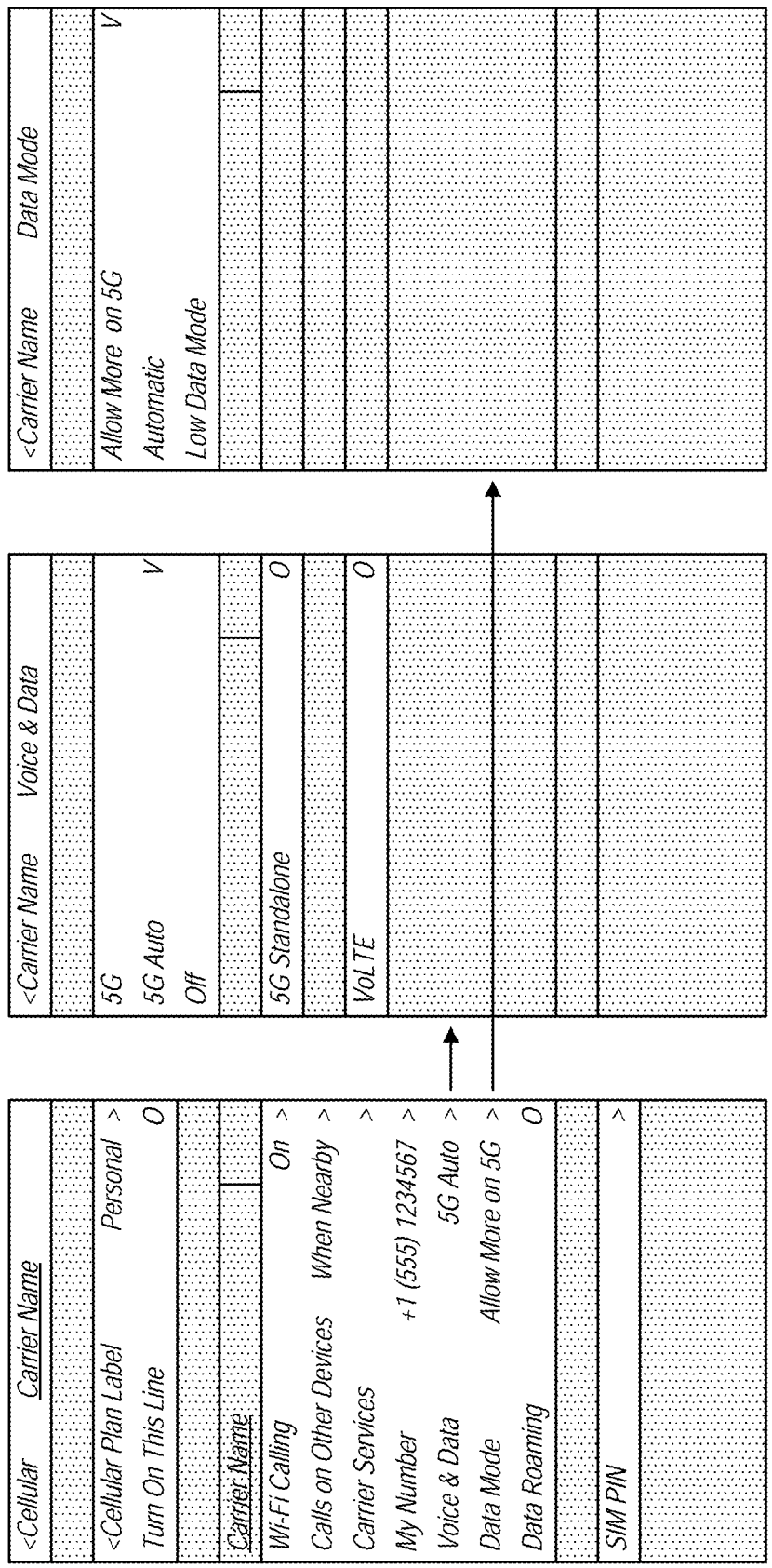
FIG. 16D illustrates an example of a fourth user interface for selection of network connections settings, according to some embodiments.
FIG. 16E illustrates an example of a fifth user interface associated with selection of voice and data settings from the fourth user interface, according to some embodiments.
FIG. 16F illustrates an example of a sixth user interface associated with selection of data mode from the fourth user interface, according to some embodiments.

FIGS. 16D-F illustrate another example of a Network Connections Settings user interface, according to some embodiments. In some embodiments, such a user interface, which may be displayed via a display of a UE, such as UE 106, may allow a user to enable and/or disable (e.g., select) various data modes, where a data mode may be associated with a data download rate and/or level. For example, FIG. 16D illustrates an example of a fourth user interface for selection of network connections settings, according to some embodiments. As shown, the fourth user interface may display various information, such as carrier name, cellular plan categorization (e.g., personal, business, and so forth), an option to access a further user interface to turn on a particular line (e.g., activate a particular SIM associated with a particular line or phone number), an option to access a further user interface associated with Wi-Fi calling, an option to access a further user interface associated with receiving calls on other devices, an option to access a further user interface associated with carrier services, an option to access a further user interface associated with phone numbers associated with the UE, an option to access a further user interface associated with voice and data settings, an option to access a further user interface associated with a data mode, an option to access a further user interface associated with data roaming, and/or an option to access a further user interface associated with a SIM personal identification number (PIN).

FIG. 16E illustrates an example of a fifth user interface associated with selection of voice and data settings from the fourth user interface, according to some embodiments. As shown, the fifth user interface may display various information, such as options for selecting a 5G state. For example, selecting "5G Auto" may provide for 5G power saving to be active. In some embodiments, 5G power savings may enable the UE to switch back to 4G LTE to save power when appropriate. As another example, selecting "Off" may disable 5G whereas selection 5G may enable 5G without enabling the UE to switch back to 4G LTE to save power when appropriate. In addition, the fifth user interface may provide an option of selecting a 5G standalone mode of operation as well as selecting VoLTE. In some embodiments, "Off" is selected, the 5G Standalone option may disappear (e.g., be removed from the fifth user interface).

FIG. 16F illustrates an example of a sixth user interface associated with selection of data mode from the first user interface, according to some embodiments. As shown, the sixth user interface may display various information, such as options for selecting a data mode. For example, selecting "Allow More on 5G" may indicate that a 5G cellular interface has been categorized as "not expensive", thus enabling a high-quality codec rate to be consistently used when accessing a 5G network. In some embodiments, if and/or when a carrier provides information to the UE indicating that a data plan is "unlimited", the "Data Mode" may be fixed at the "Allow More on 5G" setting and the "Data Mode" option of the fourth user interface may be removed to avoid the option being accessed by a user. Additionally, in some embodiments, selections for data mode may also include "Automatic" and/or "Low Data Mode", as shown in FIG. 16F. In some embodiments, the "Low Data Mode" may categorize the 5G cellular interface as "expensive", thus disabling a high-quality codec rate from being used when accessing a 5G network. In some embodiments, "Automatic" may configure the UE to switch to and from a first profile associated with "Low Data Mode" and a second profile associated with "Allow More on 5G". For example, In the first profile, the 5G cellular interface may be categorized as "expensive", however, the UE may opportunistically switch the categorization to "not expensive", e.g., based on UE conditions and/or data plan options as provided by a cellular carrier.

Figure 16G:
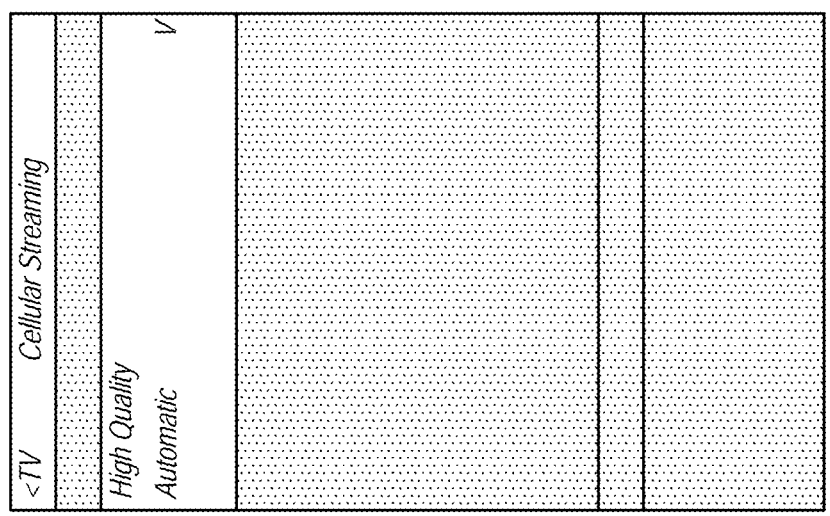
FIG. 16G illustrates an example of a seventh user interface for selection of cellular streaming options, according to some embodiments.

FIG. 16G illustrates an example of seventh user interface for selection of video streaming settings, according to some embodiments. As shown, the seventh user interface may display various information, such as options for selecting cellular streaming quality. For example, selecting "High Quality" may indicate that a video stream may use more data than average. In some embodiments, selecting "High Quality" may result in the UE accessing a higher-speed cellular data network, for example, a 5G network, when streaming video. In some embodiments, selecting "High Quality" may additionally configure the UE to categorize a 5G cellular interface as "not expensive", e.g., if and/or when a data mode is set to automatic and/or normal. In some embodiments, "High Quality" may not be an available and/or selectable option if and/or a when a data mode is set to low and/or "Low Data Mode." In some embodiments, selecting "Automatic" may indicate that a video stream may provide a user with the highest quality streaming video optimized for a data plan of the UE (and/or for a data plan associated with the UE). For example, when a UE is associated with an unlimited data plan, selecting "Automatic" may result in a video streaming application using a high-speed network, e.g., a 5G network. In addition, in some embodiments, if and/or when a data mode is set to automatic and/or normal, the UE may be configured to categorize a 5G cellular interface as "not expensive". As another example, selecting "Automatic" may result in a video stream application using a high-speed data network when a data cap of the data plan is known and/or available, e.g., when there is sufficient remaining data on the data plan. As a further example, when the data cap of the data plan is known and/or is available, but there is insufficient remaining data on the data plan, selecting "Automatic" may result in a video stream application using a lower-speed data network. Additionally, in such instances, the UE may be configured to categorize the 5G cellular interface as expensive and/or not expensive, e.g., based on whether a data mode is set to low and/or "Low Data Mode." As a yet further example, when the data cap of the data plan is known and/or is available, but the data cap has been met (e.g., the UE has consumed and/or used all available date up to the data cap), selecting "Automatic" may result in a video stream application using a lower-speed data network. Additionally, in such instances, the UE may be configured to categorize the 5G cellular interface as expensive and/or not expensive, e.g., based on whether a data mode is set to low and/or "Low Data Mode." As an additional example, if and/or when a data cap of the data plan is unavailable, selecting "Automatic" may result in a video streaming application defaulting to use of less data, for example, by using a lower-speed network. In such instances, the UE may be configured to categorize the 5G cellular interface as expensive and/or not expensive, e.g., based on whether a data mode is set to low and/or "Low Data Mode." In some embodiments, the optimization of data streaming may be a reflection of the selected data mode, e.g., as described in reference to FIGS. 16C and 16F.

FIGS. 17-19 illustrate examples of levels of data usage based on selection of various options for various UE applications, according to some embodiments. In some embodiments, application data usage may be based, at least in part, a first setting for background downloads (e.g., when an application is not active and/or not in use) and a second setting from active and/or live downloads (e.g., when an application is active and/or in use). In some embodiments, a first level of data usage may be considered a low level and may be associated with very limited use of data. A second level of data usage may be considered a normal level and may be associated with a normal use of data. A third level of data usage may be considered high while on a 5G network and may be associated with a normal use of data when not on a 5G network and a high use of data when on 5G. A fourth level of data usage may be considered a high level and may be associated with a high use of data independent of network. In some embodiments, levels of data usage may be based, at least in part, on user input received via one or more user interfaces of the UE. In some embodiments, levels of data usage may be based, at least in part, on information received from one or more carrier protocol servers through a carrier information protocol, e.g., as described herein. For example, in some embodiments, selections in "Automatic" mode may be based, at least in part, on information received from one or more carrier protocol servers. In some embodiments, applications may be required to introduce new user interfaces and/or adapt existing user interfaces to adjust application behavior to honor user selections. In other words, applications do not enforce data level usage rules, instead applications may allow for a user to provide preferences regarding data level usage.

For example, as shown in FIG. 17, an application store may be configured by a user to use a low amount of data when not in use and automatic downloads are off. However, when automatic downloads are on and the application store is not in use. Further, when the application store is in use, the application store may use a high amount of data when application downloads are set to always allow, a normal amount of data when application downloads are set to ask if over a threshold amount of data (e.g., 200 Mb), and a low amount of data with application downloads are set to always ask. As another example, a music application, when in use and streaming is on, may us a high amount of data when high quality streaming is on and a normal amount of data when high quality streaming is off. Further, when in use and streaming is off, the music application may use a low amount of data. Additionally, when not in use, the music application may use a normal amount of data when downloads are on and a low amount of data when downloads are off. As a further example, a photos application may, when not in use, use a high amount of data when unlimited updates are on and a normal amount of data when unlimited updates are off.

As another example, as shown in FIG. 18, video streaming applications may be configured by a user to use different amounts of data, e.g., based on the video streaming provider. As shown, a first video application (e.g., Video Service 1) may be configured by a user to use a system default amount of data when video playback is set to automatic. Additionally, the first video application may use a low amount of data (and/or disable cellular data) when video playback is set to WiFi only. Further, the first video application may use a normal amount of data when video playback is set to save data and a high amount of data when video playback is set to maximum data. In addition, as shown, a second video application (e.g., Video Service 2) may be configured by a user to use a low amount of data (and/or disable cellular data) when stream on WiFi only is set to on and may use a normal amount of data when stream on WiFi only is set to off. Further, the second video application may use a low amount of data when streaming quality is set to good, a normal amount of data when streaming quality is set to better, and a high amount of data when streaming quality is set to best.

As a further example, as shown in FIG. 19, a messaging application may be configured by a user to use different amounts of data, e.g., based on various selection parameters. As shown, the messaging application may select various data usages for automatic media downloads based on connection type and/or media type. For example, for photos, the messaging application may use a low amount of data when WiFi only downloads are enabled and a normal amount of data when WiFi and cellular downloads are enabled. As another example, for audio, the messaging application may use a low amount of data when WiFi only downloads are enabled and a normal amount of data when WiFi and cellular downloads are enabled. As a further example, for video, the messaging application may use a low amount of data when WiFi only downloads are enabled and a high amount of data when WiFi and cellular downloads are enabled. As yet another example, for documents, the messaging application may use a low amount of data when WiFi only downloads are enabled and a normal amount of data when WiFi and cellular downloads are enabled. In addition, when the messaging application supports voice calls within the application, the messaging application may use a low amount of data when low data usage is on and a normal amount of data when low data usage is off.

FIG. 20 illustrates an example of data rate enhancements and data use projections for a video calling application and a video streaming application, according to some embodiments. As shown, for a video calling application using LTE, a target and/or maximum bit rate may be 228 kilobytes (KBs) per second with a projected data usage of 104 megabytes (MBs) per hour. However, when the video calling application is using a combination of LTE and 5G, a target and/or maximum bit rate may be 600 KBs per second with a projected data usage of 312 MBs per hour. In addition, when the 5G plan is metered (e.g., a limited data plan) and/or unknown, a target and/or maximum bit rate may be 600 KBs per second with a projected data usage of 312 MBs per hour. Further, when the 5G plan is unlimited, a target and/or maximum bit rate may be 2 MBs per second with a projected data usage of approximately 1 gigabyte (GB) per hour. Additionally, as shown, for a video streaming application using LTE, a target and/or maximum resolution may be 768 pixels by 432 pixels (extended graphics array or XGA) with a projected data usage of 600 MB per hour. In addition, when the video streaming application is using a combination of LTE and 5G, a target and/or maximum resolution may be 768 pixels by 432 pixels (extended graphics array or XGA) with a projected data usage of 600 MB per hour. Similarly, when the 5G plan is metered (e.g., a limited data plan) and/or unknown, a target and/or maximum resolution may be 768 pixels by 432 pixels (extended graphics array or XGA) with a projected data usage of 600 MB per hour. However, when the 5G plan is unlimited, a target and/or maximum resolution may be 2048 pixels by 1152 pixels (quad wide extended graphics array or QWXGA and considered a 2K resolution as defined by Digital Cinema Initiatives) with a projected data usage of approximately 4 GBs per hour Note that such targets may be configured by the UE using the various data levels described herein as well as signaling as described herein.

FIG. 21 illustrates an example of high data mode (HDM) behavior for a number of different types of applications over a number of different networks and bands, according to some embodiments. As shown, when in an LTE only coverage area, 1 hour of video streaming at 768×432 VGA (video graphics array) resolution may use 600 MB of data and a 15-minute video call may use 78 MBs of data at a bit rate of 600 KBs per second. In addition, an over-the-air software update may result in a 7 day wait time when a manually-added 60 MB data cap is applied, a photo backup may use 50 MB of data, and an automatic download of a TV next episode may be not applicable and/or not supported. In addition, a third-party serial peripheral interface (SPI) may be set to expensive, thereby limiting a daily data budget to 50 MBs. However, when in a 5G coverage area (e.g., using LTE, using 5G sub6 (e.g., 5G deployed on frequencies less than 6 gigahertz), and/or 5G mmWave (e.g., 5G deployed on frequencies above 28 gigahertz)), 1 hour of video streaming at 2048×1152 QWXGA resolution may use approximately 4 GBs of data and a 15 minute video call may use 268 MBs of data at a bit rate of 2 MBs per second. In addition, an over-the-air software update may result in a 0 day wait (e.g., under an unlimited data plan), an unlimited amount of photo backup may be supported, and automatic download of a next TV episode may be supported. In addition, a third-party serial peripheral interface (SPI) may be set to inexpensive, thereby avoiding the daily data budget of 50 MBs.

Figure 22:
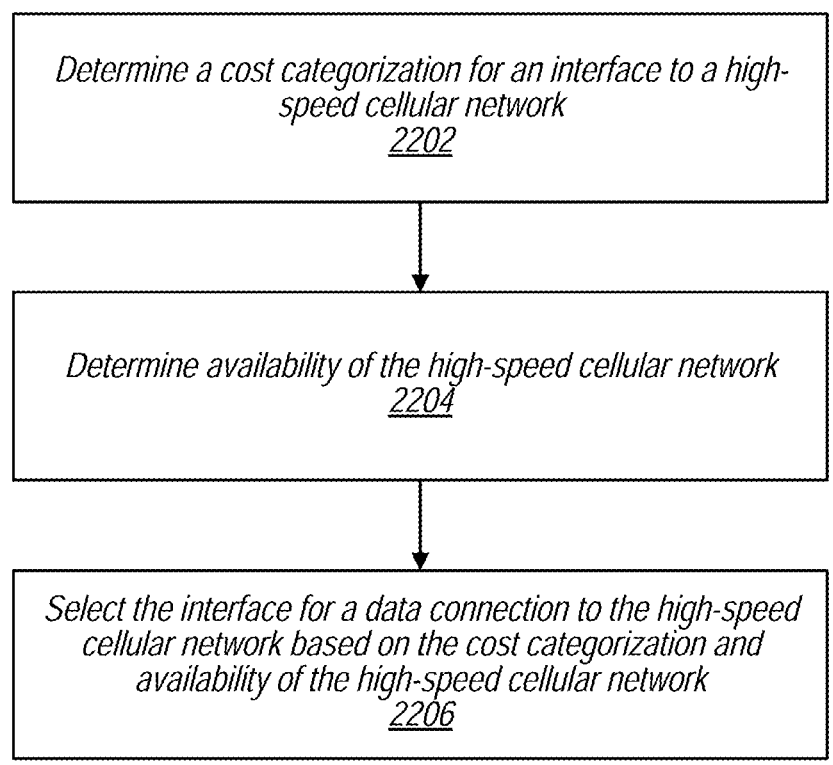
FIG. 22 illustrates a block diagram of an example of a method for switching from a low-speed data network to a high-speed data network, according to some embodiments.

FIG. 22 illustrates a block diagram of an example of a method for switching from a low-speed data network to a high-speed data network, according to some embodiments. The method shown in FIG. 22 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2202, a UE, such as UE 106, may determine a cost categorization for an interface to a high-speed data network. In some embodiments, the cost categorization may be one of "expensive" or "not expensive." In some embodiments, other cost categorizations may be used, e.g., a first level may be associated with expensive, a second level may be associated with not expensive, and so forth. In other words, the UE may determine and/or select a cost categorization from a plurality of cost categorizations. In some embodiments the high-speed cellular network (e.g., a cellular network capable of providing higher than a current average download and/or upload data rate may be considered a high-speed cellular data network) a 5G NR cellular network. In some embodiments, the low-speed cellular network (e.g., a cellular network capable of providing similar to or lower download and/or upload data rates as compared to current average data rates may be considered a low-speed cellular data network) may be an LTE (and/or 4G) cellular network. In some embodiments, a setting of not expensive may allow an associated codec rate to be commensurate with a data rate of the high-speed cellular network, e.g., in order to provide a high-quality experience to a user. In some embodiments, a setting of expensive may not allow the associated codec rate to be commensurate with the data rate of the high-speed cellular network, e.g., thereby degrading experience of the user.

In some embodiments, when a UE is in 5G NSA idle mode, the UE may access a lower-speed network, for example, a 4G LTE network. Note that while in 5G NSA idle mode, the UE may remain in a connected mode with the low-speed data network. In some embodiments, the UE may categorize (e.g., flag and/or mark) the interface to the high-speed data network as "not expensive" based, at least in part, on a SIB2 received from the high-speed data network. In some embodiments, the SIB2 may include an indication that the interface to the high-speed data network be categorized at "not expensive." In some embodiments, the SIB2 may include an instruction that the interface to the high-speed data network be categorized at "not expensive." In some embodiments, information receive via the SIB2 may allow the UE to maintain the cost categorization of "inexpensive" for the interface to the high-speed data network irrespective of whether the UE is in idle mode or in connected mode. In some embodiments, when in a connected mode, the network may add a secondary cell group (SCG) bearer based on the measurements reported by the network using a B1 measurement report.

At 2204, the UE may determine an availability of the high-speed cellular network. In other words, based on signaling received from the network and/or based on UE location, the UE may determine whether a high-speed cellular network is available for connection.

At 2206, the UE may select the interface for a data connection to the high-speed cellular network. In some embodiments, the selection may be based, at least in part, on the cost categorization and/or the availability of the high-speed data network. In some embodiments, the UE may select the interface when the cost categorization of the interface is determined to be not expensive. In some embodiments, the selection and/or cost categorization of the interface, may be further based, at least in part, on UE carrier plan information (e.g., plan information and/or contract information) received from one of a low-speed cellular network or the high-speed cellular network. In some embodiments, the UE may use the UE carrier plan information to determine a desirability of the switch, e.g., from the low-speed cellular network to the high-speed cellular network and/or from the high-speed cellular network to the low-speed cellular network. In some embodiments, the UE carrier plan information may be received from a carrier protocol service and/or from a service-based alternate server. In some embodiments, the UE carrier plan information may be received through (and/or via) a carrier information protocol. In some embodiments, the UE carrier plan information may be received through (and/or via) a carrier information protocol by establishing communication with a service-based alternate server.

In some embodiments, establishing communication with the service-based alternate server may include the UE sending a request message to the carrier protocol server and receiving a first response message from the carrier protocol server. In some embodiments, the first response message may include an indication of a service-based alternate server. The UE may send a provisioning request to the service-based alternate server and receive a second response message from the service-based alternate server. In some embodiments, the second response message may indicate successful establishment of communication with the service-based alternate server.

In some embodiments, the request message may include a first parameter that may indicate a type of service, such as a stream-saver service. In some embodiments, the request message may include one or more of (e.g., at least one of and/or any, any combination of, and/or all of) a request identifier, an action name, and/or one or more entitlement names, among other parameters and/or properties.

In some embodiments, the first response message may include confirmation of availability of the type of service, e.g., the stream-saver service. In some embodiments, the first response message may include one or more of (e.g., at least one of and/or any, any combination of, and/or all of) a response identifier, a status, a response-object, an entitlement name, an entitlement status, periods-to-skip, a service property, an alternate service identifier, an authentication token, and/or a field indicating only to use cellular radio access (e.g., cellular bearer only), among other parameters and/or properties.

In some embodiments, the provisioning request message may include an indication that the type of service (e.g., the stream-saver service) is enabled. In some embodiments, the provisioning request message may include one or more of (e.g., at least one of and/or any, any combination of, and/or all of) a request identifier, an action name, and/or an identification of provisioning elements. In some embodiments, the identification of provisioning elements may include one or more of (e.g., at least one of and/or any, any combination of, and/or all of) a name, a state, a duration, and/or data.

In some embodiments, the UE may disable communication with the service-based alternate server by sending a request message indicating disablement to the service-based alternate server and receiving a response message confirming disablement from the service-based alternate server.

In some embodiments, the type of service provided by the service-based alternate server may be a data stream saving service and/or a traffic shaping service, among other types of services. In some embodiments, the traffic shaping service may include application-based traffic shaping. In some embodiments, the traffic shaping service may provide for streaming traffic to be compressed using a higher compression codec than other data traffic.

In some embodiments, the UE carrier plan information may include information such as data plan size, historical data usage associated with the UE, one or more data rate throttling thresholds, an indication of whether the UE carrier plan includes Fifth Generation New Radio (5G NR) service, an indication of whether the UE carrier plan is an unlimited plan with data caps, an unlimited plan without data caps, and/or an unlimited plan. In some embodiments, a data plan size may be specified in terms of data usage limits. In some embodiments, the data usage limits may be in terms of gigabytes (GBs) per billing cycle. In some embodiments, the historical data usage associated with the UE may include one or more of (e.g., at least one of and/or any, any combination of, and/or all of) average data used per billing cycle, average data used per associated geographic location, remaining data for a particular billing cycle, average data used on the low-speed cellular network per billing cycle, and/or average data used on the high-speed cellular network per billing cycle. In some embodiments, the one or more data rate throttling thresholds may include one or more of (e.g., at least one of and/or any, any combination of, and/or all of) a threshold associated with data usage on the low-speed cellular network, a threshold associated with data usage on the high-speed cellular network, and/or a threshold associated with data usage on all networks.

In some embodiments, upon determining that a switch from a low-speed cellular network to a high-speed cellular network or from a high-speed cellular network to a low-speed cellular network is desirable, the UE may inform the user and request user confirmation of a network switch via a user interface. The UE may then receive user input confirming the network switch via the user interface. For example, in some embodiments, the UE may inform, via a first user interface, a user of the UE of a desirability of a switch from the low-speed cellular network to the high-speed cellular network and request, via the first user interface, confirmation of the switch from the low-speed cellular network to the high-speed cellular network. Additionally, the UE may receive, via the first user interface, a first user input confirming the switch from the low-speed cellular network to the high-speed cellular network.

As another example, in some embodiments, the UE may inform, via a first user interface, a user of the UE of a desirability of a switch from the high-speed cellular network to the low-speed cellular network and request, requesting, via the first user interface, confirmation of the switch from the high-speed cellular network to the low-speed cellular network. Additionally, the UE may receive, via the first user interface, a first user input confirming the switch from the low-speed cellular network to the high-speed cellular network.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for a mobile device to switch from a low-speed data network to a high-speed data network, comprising:
    informing, via a user interface, a user of the mobile device of a desirability of a switch from the low-speed data network to an available high-speed data network, wherein the mobile device determines a cost categorization for an interface to the high-speed data network, and wherein the cost categorization is one of expensive or not expensive;
    requesting, via the user interface, confirmation of the switch from the low-speed data network to the high-speed data network; and
    selecting, based at least in part on the cost categorization, availability of the high-speed data network, and user input confirming the switch, the interface for a data connection to the high-speed data network.

2. The method of claim 1, further comprising:
receiving, from one of the low-speed data network or the high-speed data network, carrier plan information for a cellular data service carrier; and
analyzing the carrier plan information to determine desirability of a switch.

3. The method of claim 2
wherein the carrier plan information for the cellular data service carrier is received from one or more of:
    a carrier protocol server; or
    a service-based alternate server; and
wherein the carrier plan information is received through a carrier information protocol; and
wherein the carrier plan information is received via the carrier information protocol by establishing communication with the service-based alternate server.

4. The method of claim 3,
wherein establishing communication with the service-based alternate server comprises:
    sending, to the carrier protocol server, a request message, wherein the request message includes a first parameter, wherein the first parameter indicates a stream-saver service;
    receiving, from the carrier protocol server, a first response message, wherein the first response message includes an indication of a service-based alternate server and a confirmation of availability of the stream-saver service;
    sending, to the service-based alternate server, a provisioning request message, wherein the provisioning request message includes an indication that the stream-saver service is enabled; and
    receiving, from the service-based alternate server, a second response message, wherein the second response message indicates successful establishment of communication with the service-based alternate server, and wherein a service provided by the service-based alternate server includes at least one of:
        a data stream saving service; or
        a traffic shaping service.

5. The method of claim 3,
wherein, to disable communication with the service-based alternate server, the method further comprises:
    sending, to the service-based alternate server, a request message indicating disablement of a stream-saver service; and
    receiving, from the service-based alternate server, a response message confirming disablement of the stream-saver service.

6. The method of claim 2,
wherein the carrier plan information includes one or more of:
    a data plan size;
    historical data usage;
    one or more data rate throttling thresholds;
    a first indication of whether the carrier plan includes Fifth Generation New Radio (5G NR) service; or a second indication of whether the carrier plan is one or more of:
an unlimited plan with data caps;
an unlimited plan without data caps; or
a limited plan.

7. The method of claim 1,
wherein the desirability of the switch from the low-speed data network to the high-speed data network is based, at least in part, on the cost categorization being not expensive.

8. The method of claim 1,
wherein the high-speed data network is a Fifth Generation (5G) New Radio (NR) network.

9. A mobile device, comprising:
at least one antenna;
at least one radio communicatively coupled to the at least one antenna, wherein the at least one radio is configured to perform wireless communication using at least one radio access technology (RAT); and
one or more processors coupled to the at least one radio, wherein the one or more processors and the at least one radio are configured to perform communications, and, wherein the one or more processors are configured to cause the mobile device to:
inform, via a user interface of the mobile device, a user of the mobile device of a desirability of a switch from a low-speed cellular network operating according to a first RAT to an available high-speed cellular network operating according to a second RAT, wherein the mobile device determines a first categorization for an interface to the high-speed cellular network, and wherein the first categorization is one of a first level associated with a higher compression codec rate or a second level associated with a lower compression codec rate;
request, via the user interface, confirmation of the switch from the low-speed cellular network to the high-speed cellular network; and
select, based at least in part on the first categorization, availability of the high-speed cellular network, and user input confirming the switch, the interface for a data connection to the high-speed cellular network.

10. The mobile device of claim 9,
wherein the one or more processors are further configured to cause the mobile device to:
establish communication with a service-based alternate server, wherein the service-based alternate server provides one or more of a data stream-saving service or a traffic shaping service, wherein the traffic shaping service includes application-based traffic shaping, and wherein the traffic shaping service provides for streaming traffic to be compressed using a higher compression codec than other data traffic.

11. The mobile device of claim 10,
wherein, to establish communication with the service-based alternate server, the one or more processors are further configured to cause the mobile device to:
send, to a carrier protocol server, a request message;
receive, from the carrier protocol server, a first response message, wherein the first response message includes an indication of a service-based alternate server;
send, to the service-based alternate server, a provisioning request message; and
receive, from the service-based alternate server, a second response message, wherein the second response message indicates successful establishment of communication with the service-based alternate server, and wherein a service provided by the service-based alternate server includes at least one of the data stream saving service or the traffic shaping service.

12. The mobile device of claim 11,
wherein the request message includes a first parameter, wherein the first parameter indicates a stream-saver service;
wherein the first response message further includes a confirmation of availability of the stream-saver service; and
wherein the provisioning request message includes an indication that the stream-saver service is enabled.

13. The mobile device of claim 12,
wherein the request message includes one or more of:
a request identifier;
an action name; or
one or more entitlement-names; and
wherein the first response message includes one or more of:
a request identifier;
a status;
a response;
an entitlement name;
an entitlement status;
periods-to-skip;
a service property
an alternate server identifier;
an authentication token; or
a field indicating only use cellular radio access;
wherein the provisioning request message includes one or more of:
a request identifier;
an action name; or
an identification of provisioning elements; and
wherein the identification of provisioning elements includes one or more of:
a name;
a state;
a duration; or
data.

14. The mobile device of claim 10,
wherein, to disable communication with the service-based alternate server, the one or more processors are further configured to cause the mobile device to:
send, to the service-based alternate server, a request message indicating disablement of a stream-saver service; and
receive, from the service-based alternate server, a response message confirming disablement of the stream-saver service.

15. The mobile device of claim 9,
wherein the one or more processors are further configured to cause the mobile device:
receive, from one of the low-speed cellular network or the high-speed cellular network, carrier plan information associated with the mobile device, wherein the carrier plan information includes one or more of:
a data plan size;
historical data usage;
one or more data rate throttling thresholds;
a first indication of whether the carrier plan includes Fifth Generation New Radio (5G NR) service; or
a second indication of whether the carrier plan is one or more of:
an unlimited plan with data caps;
an unlimited plan without data caps; or a limited plan;
wherein the data plan size is specified in terms of data usage limits, wherein the data usage limits are in terms of gigabytes per billing cycle, and wherein the historical data usage associated includes one or more of:
  average data used per billing cycle;
  average data used per associated geographic location;
  remaining data for a particular billing cycle;
  average data used on the low-speed cellular network per billing cycle; or
  average data used on the high-speed cellular network per billing cycle; and
wherein the one or more data rate throttling thresholds include at least one of:
  a threshold associated with data usage on the low-speed cellular network;
  a threshold associated with data usage on the high-speed cellular network; or
  a threshold associated with data usage on all networks.

16. An apparatus, comprising:
a memory; and
at least one processor in communication with the memory and configured to:
  generate instructions to inform, via a user interface of a mobile device, a user of the mobile device of a desirability of a switch from a low-speed network to an available high-speed network, wherein the at least one processor determines a categorization of expensive or not expensive for an interface to the high-speed network;
  generate instructions to request, via the user interface, confirmation of the switch from the low-speed network to the high-speed network; and
  select, based at least in part on the categorization, availability of the high-speed network, and user input confirming the switch, the interface for a data connection to the high-speed network.

17. The apparatus of claim 16,
wherein the desirability of the switch from the low-speed network to the high-speed network is based, at least in part, on the categorization being not expensive.

18. The apparatus of claim 16,
wherein the at least one processor is further configured to:
  generate instructions to send, to a carrier protocol server, a request message;
  receive, from the carrier protocol server, a first response message, wherein the first response message includes an indication of a service-based alternate server;
  generate instructions to send, to a service-based alternate server, a provisioning request message; and
  receive, from the service-based alternate server, a second response message, wherein the second response message indicates successful establishment of communication with the service-based alternate server, and wherein a service provided by the service-based alternate server includes at least one of:
    a data stream saving service; or
    a traffic shaping service.

19. The apparatus of claim 18,
wherein the request message includes a first parameter, wherein the first parameter indicates a stream-saver service;
wherein the first response message further includes a confirmation of availability of the stream-saver service; and
wherein the provisioning request message includes an indication that the stream-saver service is enabled.

20. The apparatus of claim 18,
wherein the at least one processor is further configured to:
  receive, from one of the low-speed network or the high-speed network, carrier plan information for a cellular data service carrier; and
  analyze the carrier plan information to determine desirability of a switch from the low-speed network to the high-speed network.

* * * * *